US012698129B2

(12) United States Patent
    Cheney

(10) Patent No.: US 12,698,129 B2
(45) Date of Patent: Aug. 4, 2026

(54) COLLAPSIBLE CONTAINER

(71) Applicant: TIDDLERINC LIMITED, York (GB)

(72) Inventor: Paul Cheney, Leeds (GB)

(73) Assignee: TIDDLERINC LIMITED, York (GB)

( * ) Notice: Subject to any disclaimer, the term of this patent is extended or adjusted under 35 U.S.C. 154(b) by 0 days.

(21) Appl. No.: 16/330,437

(22) PCT Filed: Sep. 5, 2017

(86) PCT No.: PCT/GB2017/052580
    § 371 (c)(1),
    (2) Date: Mar. 5, 2019

(87) PCT Pub. No.: WO2018/042210
    PCT Pub. Date: Mar. 8, 2018

(65) Prior Publication Data
    US 2020/0140144 A1    May 7, 2020

(30) Foreign Application Priority Data
    Sep. 5, 2016    (GB) ..................................... 1615043

(51) Int. Cl.
    B65D 21/08        (2006.01)
    B29D 22/00        (2006.01)
    (Continued)

(52) U.S. Cl.
    CPC ......... B65D 21/086 (2013.01); B29D 22/003 (2013.01); B65D 81/3446 (2013.01); (Continued)

(58) Field of Classification Search
    CPC .............. B65D 21/086; B65D 81/3446; B65D 2205/02; B65D 2205/025; B65D 1/225; (Continued)

(56) References Cited

U.S. PATENT DOCUMENTS 2,880,902 A * 4/1959 Owsen ...................... A45F 3/20
                                                    285/302
3,173,573 A * 3/1965 Donegan ............ B65D 83/0027
                                                    220/495.02
(Continued)

FOREIGN PATENT DOCUMENTS

EP        0719708 A1 *  7/1996
EP        1061000 A2 * 12/2000    ......... B65D 41/0442
(Continued)

OTHER PUBLICATIONS

Formabowl LLP, PCT/GB2017/052580 filed Sep. 5, 2017, "Written Opinion of the International Searching Authority", 13 pages, mailed Feb. 7, 2018.
(Continued)

*Primary Examiner* — Orlando E Aviles
*Assistant Examiner* — Brijesh V. Patel
(74) *Attorney, Agent, or Firm* — Renner, Otto, Boisselle & Sklar, LLP

(57)        ABSTRACT

A container (2) for food and/or beverage type items is at least partially defined by two or more wall portions including at least a first sidewall portion, and at least one thin or foldable wall portion (6). The container also includes a base portion and a lid (4). It is convertible between a first substantially flattened storage or transport condition and a second in-use or expanded condition by manipulation of the wall portions and/or base. The thin wall portion (6) is formed or located between a first sidewall portion and the base, and it is between 0.25 mm and 0.5 mm thick.

9 Claims, 17 Drawing Sheets

(51) Int. Cl.
    *B65D 81/34*         (2006.01)
    *B29K 23/00*         (2006.01)
    *B29K 67/00*         (2006.01)
    *B29L 31/00*         (2006.01)

(52) U.S. Cl.
    CPC .... *B29K 2023/12* (2013.01); *B29K 2067/003*
        (2013.01); *B29L 2031/7132* (2013.01)

(58) Field of Classification Search
    CPC ............ B65D 51/1694; B65D 81/3453; B29D
        22/003; B29K 2023/12; B29K 2067/003;
                     B29L 2031/7132
    USPC .............. 220/4.21, 4.24, 666, 8, 6; 206/218;
                            426/111; 215/382, 900
    See application file for complete search history.

(56)                 References Cited

U.S. PATENT DOCUMENTS

| | | | | |
|---|---|---|---|---|
| 3,220,544 A * | 11/1965 | Lovell | A61J 7/0046 | |
| | | | 206/218 | |
| 3,261,458 A * | 7/1966 | Nibecker | B65D 77/22 | |
| | | | 206/221 | |
| 3,301,293 A * | 1/1967 | Santelli | B65D 1/0292 | |
| | | | 220/666 | |
| 3,381,838 A * | 5/1968 | Mcclain | B65D 41/26 | |
| | | | 215/DIG. 7 | |
| 3,578,415 A * | 5/1971 | Hiltz | C01B 3/00 | |
| | | | 220/8 | |
| 3,939,887 A * | 2/1976 | Scarnato | B65D 1/32 | |
| | | | 220/666 | |
| 3,939,888 A * | 2/1976 | Scarnato | B65D 1/0292 | |
| | | | 220/666 | |
| 4,157,103 A * | 6/1979 | La Fleur | B65D 1/0292 | |
| | | | 141/338 | |
| 4,377,191 A * | 3/1983 | Yamaguchi | B65D 11/20 | |
| | | | 220/665 | |
| 4,526,296 A * | 7/1985 | Berger | B65D 1/0292 | |
| | | | 222/107 | |
| 4,865,211 A * | 9/1989 | Hollingsworth | B65D 1/0292 | |
| | | | 138/119 | |
| 4,875,576 A * | 10/1989 | Torgrimson | B65D 85/816 | |
| | | | 206/219 | |
| 4,930,644 A * | 6/1990 | Robbins, III | B65D 1/40 | |
| | | | 220/8 | |
| 4,979,628 A * | 12/1990 | Robbins, III | B65D 1/26 | |
| | | | 215/382 | |
| 5,224,613 A | 7/1993 | Robbins, III | | |
| 5,226,551 A | 7/1993 | Robbins, III | | |
| 5,384,138 A * | 1/1995 | Robbins, III | B29C 53/08 | |
| | | | 426/111 | |
| 5,439,128 A * | 8/1995 | Fishman | A45F 3/20 | |
| | | | 206/218 | |
| 5,518,046 A * | 5/1996 | Furukawa | B65D 1/0292 | |
| | | | 53/457 | |
| 5,533,638 A | 7/1996 | Robbins, III | | |
| 5,549,213 A * | 8/1996 | Robbins, III | B65D 43/0212 | |
| | | | 220/8 | |
| 5,573,129 A * | 11/1996 | Nagata | B65D 1/0292 | |
| | | | 220/666 | |
| 5,575,398 A * | 11/1996 | Robbins, III | A47G 23/0241 | |
| | | | 220/8 | |
| 5,632,406 A * | 5/1997 | Robbins, III | B65D 25/325 | |
| | | | 220/666 | |
| 5,711,445 A * | 1/1998 | Robbins, III | A61G 9/006 | |
| | | | 215/384 | |
| 5,860,556 A * | 1/1999 | Robbins, III | B65D 1/0292 | |
| | | | 220/666 | |
| 5,900,293 A * | 5/1999 | Zettle | B65D 1/0292 | |
| | | | 428/12 | |
| 5,911,338 A * | 6/1999 | Miller | B65D 21/0219 | |
| | | | 220/666 | |
| 6,047,848 A * | 4/2000 | Davis | B65D 1/0292 | |
| | | | 215/382 | |
| 6,315,151 B1 * | 11/2001 | Hupp | B65D 21/086 | |
| | | | 220/666 | |
| 6,705,471 B2 * | 3/2004 | Kataoka | A47J 31/02 | |
| | | | 210/474 | |
| 6,736,285 B2 * | 5/2004 | Stewart-Stand | B65D 21/086 | |
| | | | 220/666 | |
| 6,752,288 B1 * | 6/2004 | Swift | B65D 21/086 | |
| | | | 220/666 | |
| D574,673 S * | 8/2008 | Tsui | B65D 77/003 | |
| | | | D7/667 | |
| 7,654,402 B2 * | 2/2010 | Kusuma | B65D 21/086 | |
| | | | 220/8 | |
| 7,678,271 B2 * | 3/2010 | Curtin | A47J 43/24 | |
| | | | 210/232 | |
| D651,476 S * | 1/2012 | Hauser | D7/629 | |
| 8,317,046 B2 * | 11/2012 | Vanderberg | F25D 3/06 | |
| | | | 220/6 | |
| 8,844,764 B2 * | 9/2014 | Curtin | B65D 43/0206 | |
| | | | 220/666 | |
| 8,887,942 B2 * | 11/2014 | Miksovsky | B65D 1/40 | |
| | | | 220/521 | |
| 9,079,685 B2 * | 7/2015 | Sudakoff | B65D 43/0218 | |
| D739,475 S * | 9/2015 | Reed | B65D 21/086 | |
| | | | D21/472 | |
| 9,119,507 B2 * | 9/2015 | Abrams | A47J 41/0066 | |
| 9,221,582 B2 * | 12/2015 | Wheeler | B65D 21/086 | |
| D746,640 S * | 1/2016 | Myoung | D7/584 | |
| D773,126 S * | 11/2016 | Scaba | F25D 3/06 | |
| | | | D30/129 | |
| D853,663 S * | 7/2019 | Song | B65D 83/0027 | |
| | | | D30/129 | |
| 2001/0052523 A1 * | 12/2001 | Rapson | B65D 81/3294 | |
| | | | 220/506 | |
| 2002/0035928 A1 * | 3/2002 | Kataoka | A47J 31/02 | |
| | | | 99/279 | |
| 2003/0019875 A1 * | 1/2003 | Woram | B65D 21/086 | |
| | | | 220/666 | |
| 2003/0230588 A1 * | 12/2003 | Zepter | A47J 27/10 | |
| | | | 220/669 | |
| 2004/0040971 A1 * | 3/2004 | Athalye | B65D 5/3628 | |
| | | | 220/666 | |
| 2005/0127074 A1 * | 6/2005 | Kusuma | B65D 21/086 | |
| | | | 220/6 | |
| 2006/0096929 A1 * | 5/2006 | Repp | A47J 19/00 | |
| | | | 210/740 | |
| 2006/0191929 A1 * | 8/2006 | Berg | B65D 33/2508 | |
| | | | 220/6 | |
| 2007/0023439 A1 * | 2/2007 | Vaughn | F25D 3/08 | |
| | | | 220/592.03 | |
| 2007/0251874 A1 * | 11/2007 | Stewart | A47J 43/22 | |
| | | | 210/473 | |
| 2008/0099476 A1 * | 5/2008 | Fung | B65D 15/18 | |
| | | | 220/6 | |
| 2009/0202684 A1 * | 8/2009 | Willemsen | B65D 77/2032 | |
| | | | 426/110 | |
| 2010/0183773 A1 * | 7/2010 | Malone | B65D 77/2048 | |
| | | | 426/107 | |
| 2011/0163092 A1 * | 7/2011 | Hacsi | B65D 21/086 | |
| | | | 53/469 | |
| 2011/0272419 A1 * | 11/2011 | Vanderberg | B65D 21/086 | |
| | | | 220/666 | |
| 2011/0311688 A1 * | 12/2011 | Becraft | B65D 77/003 | |
| | | | 426/111 | |
| 2013/0032592 A1 * | 2/2013 | Lee | B65D 21/086 | |
| | | | 220/8 | |
| 2013/0075393 A1 * | 3/2013 | Haynie | B65D 1/0292 | |
| | | | 220/6 | |
| 2013/0180985 A1 * | 7/2013 | Damaghi | B65D 81/22 | |
| | | | 220/200 | |
| 2013/0277364 A1 * | 10/2013 | Kusuma | A45F 3/20 | |
| | | | 220/8 | |
| 2014/0061193 A1 * | 3/2014 | Sudakoff | B65D 21/086 | |
| | | | 220/200 | |

(56)     References Cited

U.S. PATENT DOCUMENTS

| | | | | |
|---|---|---|---|---|
| 2015/0096978 A1 * | 4/2015 | Henderson | ......... | B65D 81/3453 |
| | | | | 220/8 |
| 2015/0251808 A1 * | 9/2015 | Tsui | ...................... | A47L 19/04 |
| | | | | 220/8 |
| 2015/0253055 A1 * | 9/2015 | Tsui | ...................... | B62B 5/066 |
| | | | | 62/62 |
| 2015/0366395 A1 * | 12/2015 | Do | ...................... | A47J 31/4403 |
| | | | | 99/323 |
| 2016/0347503 A1 * | 12/2016 | Tsui | ................. | A47J 27/21008 |
| 2017/0050800 A1 * | 2/2017 | Gain | ......................... | A45F 3/20 |

FOREIGN PATENT DOCUMENTS

| | | | | | |
|---|---|---|---|---|---|
| GB | 2530800 A | * | 4/2016 | ........... | B65D 21/086 |
| WO | 9524347 A1 | | 9/1995 | | |
| WO | WO-9315995 A1 | * | 8/1996 | ......... | A47G 23/0241 |
| WO | 9829315 A1 | | 7/1998 | | |
| WO | 2016051208 A1 | | 4/2016 | | |

OTHER PUBLICATIONS

Formabowl LLP, PCT/GB2017/052580 filed Sep. 5, 2017, "International Search Report", 7 pages, mailed Feb. 7, 2018.

* cited by examiner

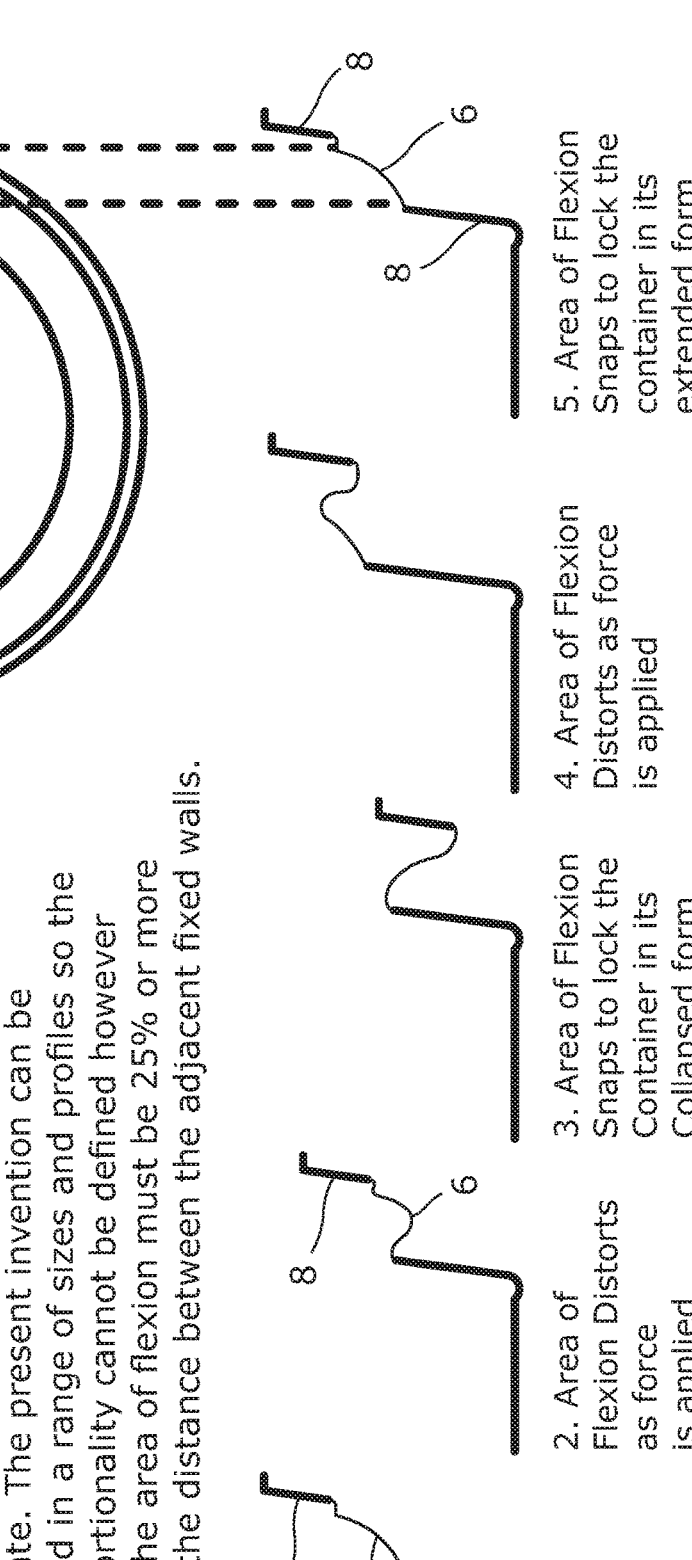

Description of Area of flexion

Fundamental to the present invention is that the area of flexion must be longer than the gap between the 2 adjacent fixed walls.

These fixed walls force the area of flexion to distort as the container is transferred from it's extended to collapse state, snap and remain stable, locking the container into either it's extended or collapsed state. The present invention can be manufactured in a range of sizes and profiles so the size or proportionality cannot be defined however in all cases the area of flexion must be 25% or more longer than the distance between the adjacent fixed walls.

X plus 25% or greater

1. Extended Container

2. Area of Flexion Distorts as force is applied

3. Area of Flexion Snaps to lock the Container in its Collapsed form

4. Area of Flexion Distorts as force is applied

5. Area of Flexion Snaps to lock the container in its extended form

Figure 2b

Extended

22

4

Film pealed back to
expose breather hole

Sealing Pattern

4

22

Breather hole in
seal area exposed

22

4

Single point injection
of polymer

14

Polymer Chain
flows across
not along
area of flexion

2

8

6

8

The area of Flexion, effectively the thinner wall section, can be extended into thicker sections of adjacent walls creating areas within the thicker wall sections that flex as the container is formed, reducing the total force required to erect to container

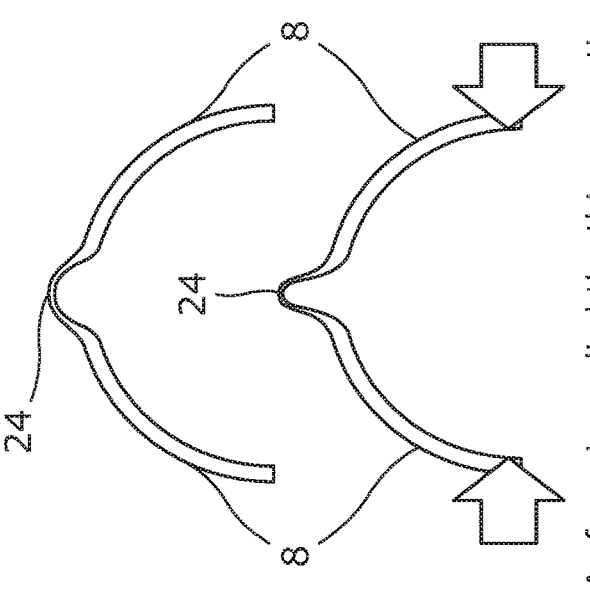

As force is applied the thinner section collapses reducing the internal dimension and the force required to form the bowl

Figure 16b

Bow Strip

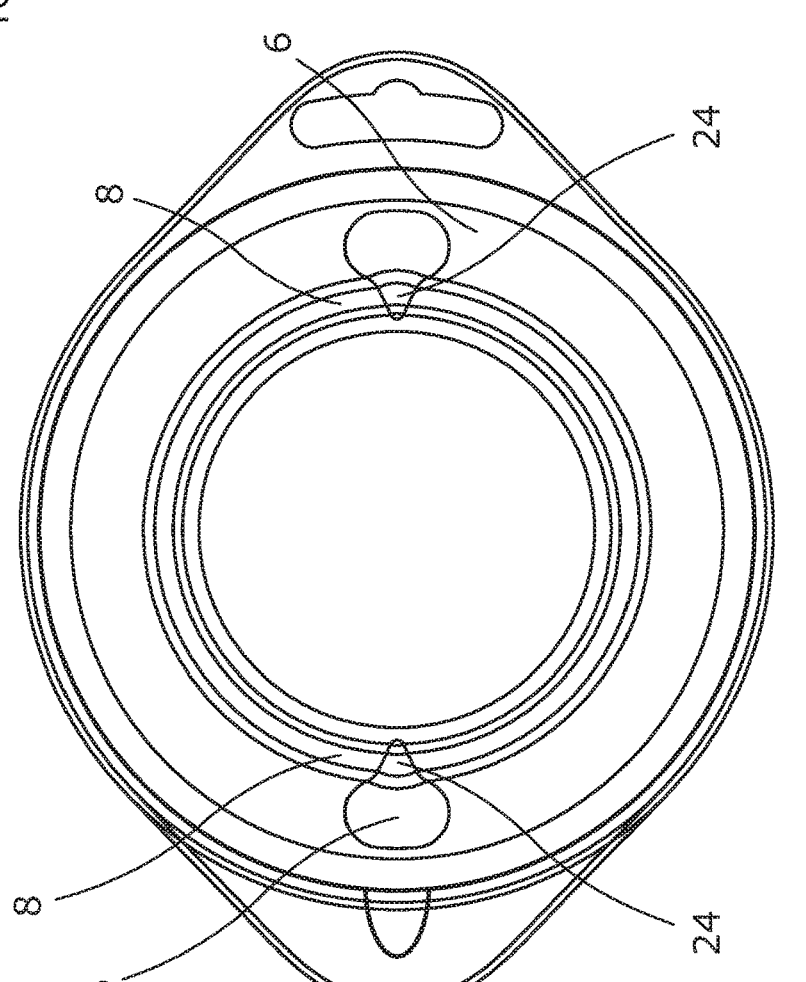

Figure 16a

COLLAPSIBLE CONTAINER

The present invention relates to an improved collapsible container for one or more items.

Although the following description refers to single containers for food and drink type items, the person skilled in the art will appreciate that the present invention could be used to contain and transport other non-food based items and is not limited to food, drink and beverages. In addition the skilled person will recognise that the container may be used for multiple times.

The provision of collapsible containers where the container is formed by expansion at the point of use rather than transporting the void through the point of use is known.

WO2015/054402 discloses a container that can be moved between a collapsed and expanded form using a series of living hinges. The primary problems with such a container are twofold:—

A) a series of living hinges creates serious difficulty in production of the container, such a container is impossible or very costly to produce on a significant scale and B) a series of living hinges contain sufficient potential energy which can be released when minimal force or heat is applied, making such a container unstable in use.

The applicant's co-pending application PCT/GB2015/052901 herein incorporated by reference goes some way to addressing the abovementioned problems.

It is therefore an aim of the present invention to provide an improved container that addresses the abovementioned problems.

It is a further aim of the present invention to provide a method of manufacturing a container that addresses the abovementioned problems.

It is a yet further aim of the present invention to provide a method of combining one or more items in a container that addresses the abovementioned problems.

In a first aspect of the invention there is provided a container for food and/or beverage type items, said container at least partially defined by two or more wall portions, said wall portions including at least a first sidewall portion, and at least one thin or foldable wall portion, said container also including a base portion and a lid and is convertible between a first substantially flattened storage or transport condition and a second in-use or expanded condition by manipulation of the wall portions and/or base, said at least one thin wall portion being formed or located between a first sidewall portion and the base, wherein the thin wall portion is between, or is substantially between, 0.25 mm and 0.5 mm.

In preferred embodiments the container is manufactured from polypropylene and/or polyethylene.

Typically the thin wall portion of a substantially polypropylene material is 0.25-0.45 mm thick or in cross sectional width. Further typically the wall thickness is substantially 0.31 mm.

Typically the thin wall portion of a substantially polyethylene material is 0.25-0.50 mm thick or in cross sectional width. Further typically the wall thickness is substantially 0.35 mm.

In one embodiment the container is substantially constructed of polyethylene terephthalate (PET) or PET based material.

In one embodiment the container is manufactured from polypropylene base material plus additives for hot fill, microwave and other food applications. Typically the thin wall portion has a thickness of 0.25-0.45 mm, preferably 0.31 mm.

In one embodiment the container is manufactured from polyethylene base material plus additives for cold and other non-food applications. Typically the thin wall portion has a thickness of 0.25-0.5 mm, preferably 0.35 mm.

Typically the additives for hot fill and/or cold fill applications are one or more plasticisers.

In one embodiment the thin wall portion is curved or non-linear when in at least the second in-use or expanded condition. Typically the top to bottom length of the thin wall portion is at least 25% greater or longer than the distance between first and second sidewall portions and/or at least 25% greater or longer than the linear distance between a sidewall portion and the base portion when viewed in plan in said second or in-use or expanded condition.

Thus a collapsible container is provided that can be converted between a collapsed or storage configuration and an expanded configuration. Typically the thin wall portion is and/or substantially forms a region of flexion. Further typically the thin wall bend, flexes, folds and/or the like at one or more points on the area of the same when moving the container between the first and second conditions.

In a preferred embodiment the container includes first and at least a second sidewall portion wherein said thin wall portion is disposed or located substantially between the side wall portions. Typically the second sidewall portion is attached to and/or depends from the base portion. Further typically the thin wall portion forms a band around the container.

Typically the at least one thin wall bands are formed circumferentially around the container. The at least one thin wall band can be between sidewall portions, or between a sidewall portion and the base, or between a sidewall portion and the lid. Further typically the bands are formed in a horizontal plane around the container.

In one embodiment the thin wall portion depends from the second sidewall portion forming a region of flexion between said first and second sidewall portion and is attached to the bottom of the first sidewall portion, typically the thin wall is flexible or substantially more flexible than the thin wall. Typically the thin wall portion depends from substantially the top of the second sidewall portion.

In one embodiment the area where the thin wall portion and the second sidewall portion is connected includes some resilience and/or is resiliently biased. Typically the area acts as a spring that substantially holds the container in the first and/or second conditions. Further typically the area of flexion is resiliently biased to the extended and collapsed positions. Typically the area of flexion distorts as force is applied when moving the container between the two conditions.

In one embodiment at one or more locations the thin wall portion extends substantially vertically, or along a substantially vertical axis into an adjacent sidewall portion. This creates areas within the thicker sidewall portion that is capable of moving or flexing as the container is moved from the first condition to the second condition for use. Typically at least part of the thin wall portion extending up and/or down into an adjacent sidewall portion reduces the total force required to erect the container.

In one embodiment, as force is applied the thinner thin wall portion which extends into the side wall portion at least partially collapses, thereby reducing the internal dimension and the force required to form the container in the expanded condition.

In one embodiment there are at least two locations where the thin wall portion extends into a sidewall portion. Typically the locations are substantially opposite and/or in opposed positions on either side of the container. Further typically the locations act as hinges allowing the container to flex substantially along a vertical axis in moving from the first to at least the second condition.

Further preferably the container includes a lid wherein at least a portion of the lid being removable to access the items contained therein in use. Preferably the lid portion is substantially flexible polymer material.

In one embodiment the lid is sealed to the container. Typically the lid is a film lid.

Preferably the container is provided with a sealed lid in the first condition. Typically the lid is attached with one or more adhesives and at least part of the lid is released or removed prior to use and/or movement to the second condition.

In one embodiment at least part of the lid can be selectively removed. Typically at least part of the lid can be removed to selectively open one or more compartments. Further typically, the lid can be selectively opened leaving one or more compartments closed.

Typically once removed the lid cannot be re-attached or affixed. Thus the container is a single use container and the lid cannot be attached for the container to be used for the same use.

In one embodiment the lid is heat sealed. Typically one removed the lid cannot be reapplied.

In one embodiment the container has a self-adhesive label or lid. Typically once removed the lid cannot be reapplied well enough to create a seal and in particular a hermetic seal such that the container can be re-used as a sealed container.

In one embodiment the container includes a breather hole or aperture. Typically the breather hole is arranged to be substantially part of the container wall and/or lid. Further typically at least part of the breather hole is formed by a sidewall portion of the container.

In one embodiment the breather hole is formed by a cut or aperture formed in the lid. Typically the breather hole is opened by releasing part of the lid or removing one or more pre-cut portions of the lid.

In one embodiment the lid is partially pealed back to expose the breather hole allowing any vacuum inside the container to be released. Typically exposing the breather hole allows any pressure differential created by expanding the container into its extended state or expanded condition for use.

In one embodiment the present invention has a breather hole or aperture substantially incorporated into the film lid sealing pattern. Typically the lid is partially pealed back to expose the breather hole allowing the any pressure differential or vacuum inside the container to be released and container expanded into its extended state.

In one embodiment the breather hole is sized to control the rate at which air is expelled from the container as pressure/force is generated during a heating or cooking process. Increasing or reducing the size of this hole varies the rate that air is expelled from the container during the cooking process.

Typically removing at least part of the lid and/or exposing a breather hole ensures that the container is a single use container as the container cannot be reused for containing and/or cooking foodstuffs.

Some products, for example popcorn, create pressure within the container when microwaved. In one embodiment the rate at which air is allowed to escape from the container in the microwave cooking process is restricted by narrowing the breather hole. This generates pressure or a positive pressure differential within the container. In one embodiment sufficient force or pressure is generated to move the container from its collapsed to the extended/expanded state during the microwave cooking process.

Typically at least the sidewall portions are substantially linear, straight or non-curved when viewed in vertical cross-section. Further typically the thin wall portion is substantially curved, non-linear and/or S-shaped when viewed in vertical cross section in at least the second condition. Typically the S-shape is an elongated S-shape.

In one embodiment the thin wall portions are substantially inverted and/or turned upside down when moving the container from the first condition to the second condition.

Typically the thin wall portion is smaller in cross sectional area or diameter when compared to the one or more sidewall portions. Further typically the at least one sidewall portion is thicker or larger in cross section in comparison to the one or more thin wall portions.

Further typically the sidewall portions are more rigid than the thin wall portions. Typically the thin wall portions are more flexible or less rigid than the side wall portions.

Typically, at least part of the thin wall portions roll when moving the container between the first and second conditions. Further typically the thin wall portion rolls rather than hinging. This ensures that the side wall portions remain in the same plain when moving between conditions.

Thus the container is substantially expandable when moved or manipulated to the second condition. Furthermore the container is substantially collapsible when moved or manipulated from the second condition to the first.

Typically the size of the container is increased or expanded in at least one dimension when moved from the first to the second condition. Further typically the flexible or thin wall portions are collapsible such that the volume of the container is smaller in the first condition than the second.

In one embodiment the thin wall portions at least partially define one or more compartments. Typically the thin wall portions, sidewall portions and/or the base portion define one or more compartments when in the first condition. Further typically the sidewall portions, thin wall portions and the base define a single compartment in the second in use condition.

In one embodiment the thin wall portions are connected or substantially attached to the base and/or sidewall portions by one or more flexible portions, sprung portions, fold-lines and/or the like.

Thus items can be kept separate in different compartments inside a container when in the first condition and by manipulation of the container the contents can be mixed and/or a larger compartment formed.

In one embodiment an outer sidewall is located substantially around the periphery of the container in at least the first condition.

In one embodiment at least a first thin wall portion is located substantially between the outer wall and a second sidewall portion located inside the outer wall portion when in the first condition.

In one embodiment the container includes a second thin wall portion located substantially between a second and third side wall portions. Typically that the walls of a container can be formed by a series of side wall portions with thin wall portions disposed between the same. Further typically the walls of the container comprise alternating sidewall portions and thin wall portions.

In one embodiment the compartments are substantially concentric with the outer sidewall portion. Typically the outer sidewall portion is substantially circular or cylindrical.

In one embodiment at least part of the thin or foldable wall portion and/or regions of flexion are manipulated or moved to substantially extend the walls and/or height of the container in the second expanded in-use condition. Further typically the compartments are combined or consolidated by the movement of the thin wall portions towards the second condition.

In one embodiment at least the wall members comprise a substantially resilient material. In a preferred embodiment at least the wall members comprise polypropylene and/or polyethylene.

Typically the thin wall portions are deformed by manipulation, applying pressure, force, pulling and/or the like to the sidewall portions and/or the base portion. Further typically the wall portions and/or the base portion retain substantially their original shape or form when in at least the second condition.

In one embodiment the regions of flexion form one or more ridges or peaks when in at least the first condition. Typically the side wall members are substantially vertical when in the first and/or second condition. Further typically the wall portions and/or areas of flexion substantially partition the inside of the container into two or more compartments when in at least the first condition.

In one embodiment the ridges abut and/or contact the lid in at least the first condition. Typically one or more of the ridges are attached and/or adhered to at least part of the lid.

In one embodiment at least part of the lid can be selectively removed. Typically at least part of the lid can be removed to open one or more compartments, leaving one or more compartments closed.

Typically once used, substantially empty and/or the contents accessed the container can be collapsed to aid disposal and/or storage.

Further typically the container is a single use and/or disposable container.

In one embodiment the lid, or at least part thereof is detachably attached to at least part of the outer sidewall.

In one preferred embodiment the container includes a circular base portion. Typically the base portion is substantially centrally located.

In one embodiment the container includes a rim portion. Typically the rim portion depends outwardly from the edge of the outer side wall. Further typically the rim depends substantially perpendicularly from the edge of the outer sidewall portion.

In one embodiment the container is expanded or extended from the base portion by pulling the rim and/or outer wall upwards or in combination or alternatively pulling the base downwards, thereby expanding the container in a substantially vertical direction.

In one embodiment the container includes one or more grip members to provide the user with a portion or section to grip or hold and enable the container to be moved from the first to at least the second condition. Typically the grip members are any one or any combination of tabs, labels, flaps and/or the like.

Preferably at least the wall portions of the container are formed from injection moulding. Further preferable the wall portions, including the sidewall portion and thin wall portions, and/or the base portion are formed from single point injection moulding. Typically the moulding process is single point hot tip injection moulding to form the container.

In a second aspect of the invention there is provided a container for food and/or beverage type items, said container at least partially defined by two or more wall portions, said wall portions including at least a first sidewall portion, and at least one thin or foldable wall portion, said container also including a base portion and a lid and is convertible between a first substantially flattened storage or transport condition and a second in-use or expanded condition by manipulation of the wall portions and/or base, said at least one thin wall portion being formed or located between a first sidewall portion and the base, wherein the thin wall portion is, or is substantially, curved or non-linear when in at least the second in-use or expanded condition and the length of the thin wall portion is at least 25% greater or longer than the linear distance between first and second sidewall portions and/or at least 25% greater or longer than the linear distance between a first sidewall portion and the base portion when in said second or in-use or expanded condition.

The linear distance is the horizontal distance between a side wall portion and a second sidewall portion or the base when viewed in horizontal or plan cross section. The length of the length of the thin wall portion is the length of wall between the top and bottom of the thin wall portion when viewed in vertical cross section.

Typically at least one the thin wall portion is located between a first and second side wall portions.

Further typically, the length of the thin wall and the linear distance between the base and side wall portion, and/or the distance between the side wall portions is measured In a third aspect of the invention there is provided a container including at least one side wall portion and at least one foldable or thin wall portion, said container formed from single point injection moulding.

Preferably the process by which the container is formed is a single point injection moulding process. Typically a hot tip is used for the injection.

Typically the wall or walls closest to the point at which polymer is injected into the injection forming mould are substantially circular. Single point injection moulding and the substantially circular shape of the container combine to ensure the correct molecular alignment as the polymer flows into the mold. It is critical when injection molding the present invention that the length of the polymer molecular chain flows across and not around at least the thin wall portion or areas of flexion In a further aspect of the invention there is provided a method of forming a container, said container including at least one side wall portion and at least one foldable or thin wall portion wherein the method includes the step of injecting a polymer into a mould.

Preferably the injection is a single point hot tip injection.

In a yet further aspect of the invention there is provided a container for food and/or beverage type items, said container at least partially defined by an outer wall, a foldable portion and a lid, at least a portion of the lid being removable to access the items contained therein in use and the container is convertible between a first substantially flattened storage or transport condition and a second in-use condition by manipulation of the foldable portion wherein the foldable portion forms one or more compartments inside the container when in the first condition and said outer wall and/or foldable portions are substantially straight or linear when the container is viewed in vertical cross section.

Typically the side wall portions remain substantially in the same plane when moving between the first and second conditions.

In a yet further aspect of the invention there is provided a container for food and/or beverage type items, said container at least partially defined by an outer wall, a foldable portion and a lid, at least a portion of the lid being removable to access the items contained therein in use and the container is convertible between a first substantially flattened storage or transport condition and a second in-use condition by manipulation of the foldable portion wherein the foldable portion forms one or more compartments inside the container when in the first condition.

Thus the container is substantially expandable when moved or manipulated to the second condition. Furthermore the container is substantially collapsible when moved or manipulated from the second condition to the first.

Typically the size of the container is increased or expanded in at least one dimension when moved from the first to the second condition. Further typically the foldable portion is collapsible such that the volume of the container is smaller in the first condition than the second.

Typically the foldable portion includes a number of members or walls that at least partially define the one or more compartments. Further typically the foldable members are connected or substantially attached by one or more flexible portions, fold-lines and/or the like.

Thus items can be kept separate in different compartments inside a container when in the first condition and by manipulation of the container the contents can be mixed and/or a larger compartment formed.

In one embodiment the outer wall is located substantially around the periphery of the container in at least the first condition.

In one embodiment the foldable portion is located substantially between the outer wall.

In one embodiment the compartments are substantially concentric with the outer wall. Typically the outer wall is substantially circular or cylindrical.

In one embodiment at least part of the foldable portion and/or members are manipulated or moved to substantially extend the outer wall of the container in the second expanded in-use condition. Typically the foldable portion is manipulated or unfolded to increase the size of the compartments. Further typically the compartments are combined or consolidated by unfolding the foldable portion towards the second condition.

In one embodiment the foldable portion and/or members forming the same comprise a substantially resilient material. Typically the material can be deformed by manipulation, applying pressure and or the like but at least the members retain substantially their original shape or form.

In one embodiment the foldable portion members form one or more ridges or inner walls when in at least the first condition. Typically the foldable portion members thereby partition the inside of the container into two or more compartments when in at least the first condition. Further typically moving one or more members removes the partition and/or moves the container to the second condition.

In one embodiment the ridges abut and/or contact the lid in at least the first condition. Typically one or more of the ridges are attached and/or adhered to at least part of the lid.

In one embodiment at least part of the lid can be selectively removed. Typically at least part of the lid can be removed to open one or more compartments, leaving one or more compartments closed.

Typically once used, substantially empty and/or the contents accessed the container can be collapsed to aid disposal and/or storage.

In one embodiment the lid, or at least part thereof is detachably attached to at least part of the outer wall.

In one embodiment the container includes a base portion. Typically the base portion is substantially centrally located.

In one embodiment the container is expanded or extended from the base portion by pulling the outer wall upwards, thereby expanding the container in a substantially vertical direction.

In a yet further aspect of the invention there is provided a method of manufacturing a container, said container including an outer wall, a foldable portion and a lid, at least a portion of the lid being removable to access the items contained therein in use and the container is convertible between a first substantially flattened storage or transport condition and a second in-use condition container by manipulation of the foldable portion wherein the foldable portion forms one or more compartments inside the container when in the first condition, said method including the step of;

substantially forming at least part of the container from plastics material.

Typically at least part of the foldable portion comprises plastics material.

In a yet further aspect of the invention there is provided method of combining one or more items in a container, said container including an outer wall, a foldable portion and a lid, at least a portion of the lid being removable to access the items contained therein in use and the container is convertible between a first substantially flattened storage or transport condition and a second in-use condition container by manipulation of the foldable portion wherein the foldable portion forms one or more compartments for location or separation of items inside the container when in the first condition, and the method includes the step of;

manipulating the foldable portion such that the contents of the compartments is combined.

Typically the foldable portion is at least partially unfolded and/or expanded to remove one or more of the partitions forming the compartment.

In one embodiment the container includes one or more apertures configured to receive or enclose one or more utensils. Typically the one or more apertures are formed in the base portion of the container. Further typically the utensils include Spoon, Fork, Spork, chop sticks and/or the like.

In one embodiment the container is attached to one or more utensils. Typically the utensil is attached by heat sealing and/or a label.

In a further aspect of the invention there is provided a collapsible container.

In one embodiment the container is produced or manufactured using vacuum forming.

Specific embodiments of the invention are now described with reference to the following figures wherein;

FIGS. 2a-2d shows cross sectional views of containers illustrating how the thin wall portion/area of flexion distorts as the container is collapsed and then returned to its extended state;

Figure 1:
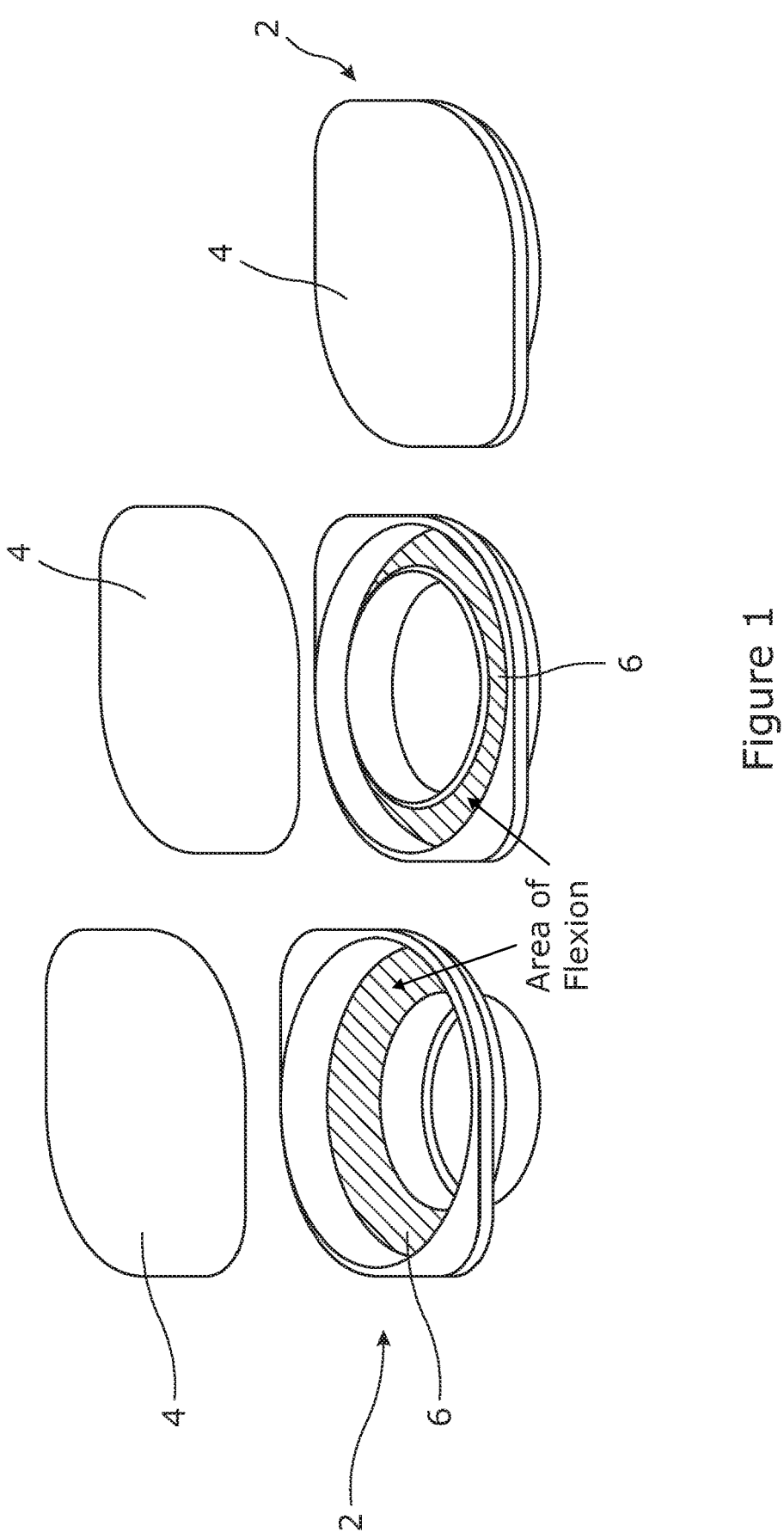
FIG. 1 shows views of a container according to one embodiment of the invention.

The present invention relates to a single use collapsible plastic packaging container 2 with sealed lid 4 as shown in FIG. 1. The body of the container is primarily constructed from polypropylene or polyethylene with a separate lid 4 sealed to it enabling the package to contain, preserve, protect, store and merchandise the product it contains.

Figure 2A:
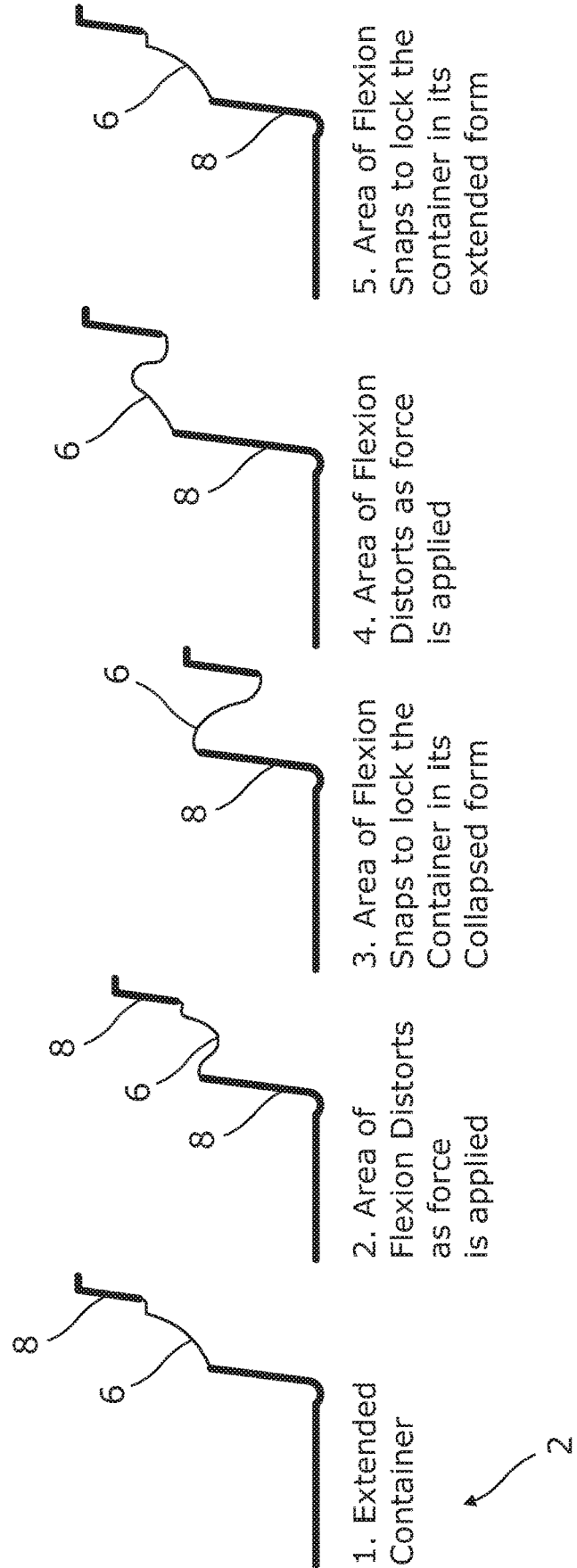
Figures 2C, 2D:
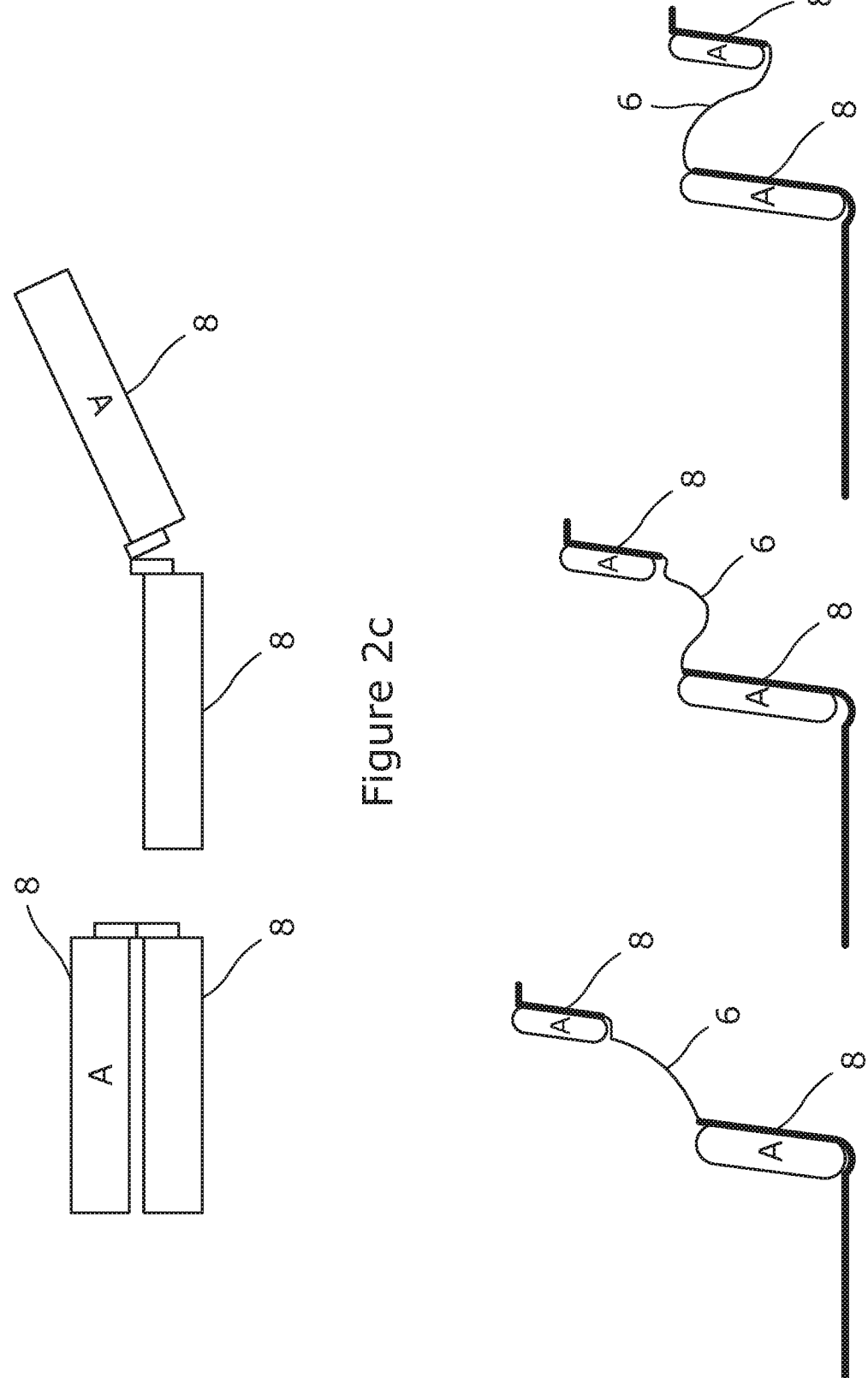

The container is configured with one or more thin flexible wall portions 6, henceforth referred to as "Areas of Flexion" which, when force is applied distort, collapse and snap into an inverted position allowing the container to collapse and revert to its extended form whilst remaining stable in either its extended or collapsed state. The side wall portions 8 are relatively inflexible or more rigid compared to the areas of flexion 6. The process of inversion or extension and compression is shown in FIG. 2.

Figure 3:
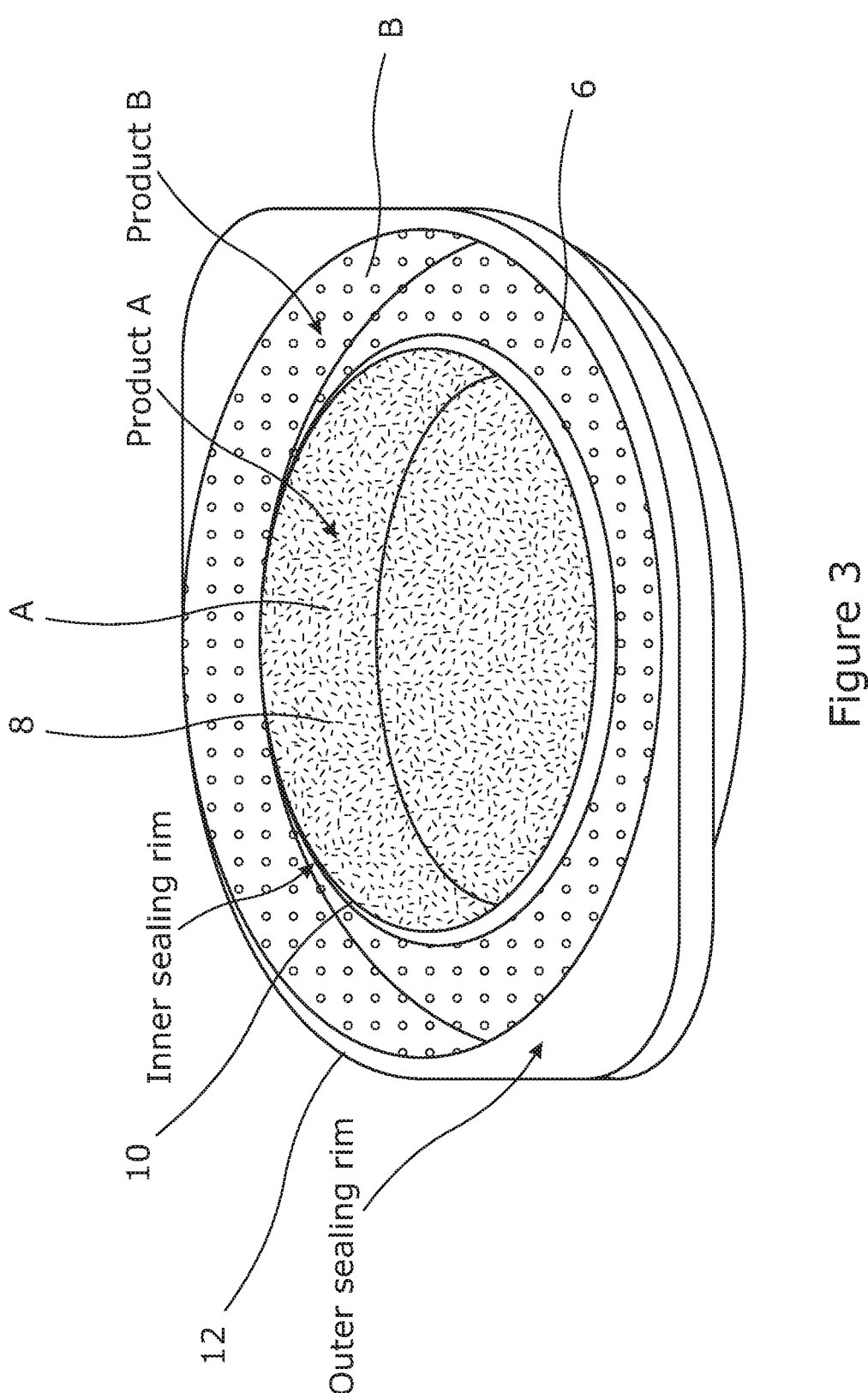
FIG. 3 shows one embodiment of the invention where two different food products can be stored in separate compartments.

A flexible film lid 4 can be sealed to one or more walls of the container allowing one or more products A, B to be contained discreetly within, as shown in FIG. 3 where the lid is sealed to the inner sealing rim 10 and an outer sealing rim 12 defining two discreet annular portions or chambers within the container in its collapsed state. The filled package is transported, stored and sold in its collapsed state. The consumer opens the container and pops the container back up into its original extended form, creating the void required for product to be mixed, prepared, dispensed or consumed directly from.

The present invention relies on the areas of flexion to distort and snap into position making the collapsed and extended container rigid and stable in either state. The material must be thin enough to distort as force is applied and have enough strength to snap into position when manipulated from its collapsed to extended state or vice versa. The present invention can be manufactured in a range of sizes and profiles so the size or proportionality cannot be defined however in all cases the area of flexion or thin wall is 25% or more longer (vertically from top to bottom) than the distance between the adjacent thick walls when viewed in plan as shown in FIG. 2b.

This arrangement is significantly different to a "living hinge" arrangement shown in FIG. 3c which is utilised in packaging materials such as toothpaste and sauce caps. Here the thick or side wall portions are inverted to effect the transfer from the open to closed state. The present invention utilises an area of flexion 6 and two adjacent fixed walls to effect a transfer from its extended to collapsed state. The area of flexion 6 rolls rather than hinging. This unique element ensures both adjacent walls remain in the same plain as shown in FIG. 3d, i.e. are not inverted as with a living hinge.

In one embodiment the present invention is manufactured from Polypropylene base material plus additives for hot fill, microwave and other food applications. The area of flexion on such material is typically between 0.25 mm and 0.45 mm, ideally 0.31 mm.

In one embodiment the present invention is manufactured from Polyethylene base material plus additives for cold fill and other non-food applications. The area of flexion on such material is typically between 0.25 mm and 0.5 mm, ideally 0.35 mm.

Someone skilled in the art would recognise that the present invention could also be manufactured from a Polyethylene Terephthalate (PET) based material.

The present invention, is manufactured by single point injection moulding method.

The person skilled in the art would recognise that this invention could be manufactured in a vacuum forming process.

In one embodiment at least part of the film lid can be selectively removed. Typically at least part of the lid can be removed to open one or more compartments, leaving one or more compartments closed.

In one embodiment the present invention has a breather hole incorporated into the container wall. The lid is partially pealed back to expose the breather hole allowing the vacuum inside the container to be released and container expanded into its extended state.

In one embodiment the present invention has a breather hole incorporated into the film lid sealing pattern. The lid is partially pealed back to expose the breather hole allowing the vacuum inside the container to be released and container expanded into its extended state.

In one embodiment the breather hole is sized to control the rate at which air is expelled from the container as pressure/force is generated during the cooking process. Increasing or reducing the size of this hole varies the rate that air is expelled from the container during the cooking process.

Some products (e.g. Popcorn) create pressure within the container when microwaved. In one embodiment the rate at which air is allowed to escape from the container in the microwave cooking process is restricted by narrowing the breather hole. This generates pressure within the container and sufficient force to move the container from its collapsed to extended state during the microwave cooking process.

Someone skilled in the art would recognise that other food and non-food products could be prepared this way.

Typically once used, substantially empty and/or the contents accessed the container can be collapsed to aid disposal and/or storage.

Someone skilled in the art would appreciate that it is possible to produce such a container with up to seven combinations of rigid walls and areas of flexion.

Someone skilled in the art would recognise that the container can be moulded in many shapes.

In one embodiment the container includes one or more grip members to provide the user with a portion or section to grip or hold and enable the container to be moved from the first to at least the second condition. Typically the grip members are any one or any combination of tabs, labels, flaps attached or embedded utensils and/or the like.

In one embodiment the outer wall is located substantially around the periphery of the container in its collapsed form.

In one embodiment the foldable portion is located substantially between the outer wall or walls.

In one embodiment the compartments are substantially concentric with the outer wall. Typically the wall or walls closest to the point at which polymer is injected into the injection forming mould are substantially circular. Single point injection moulding and the substantially circular shape of the container combine to ensure the correct molecular alignment as the polymer flows into the mold. It is critical when injection molding the present invention that the length of the polymer molecular chain flows across and not around the areas of flexion.

Figure 4A:
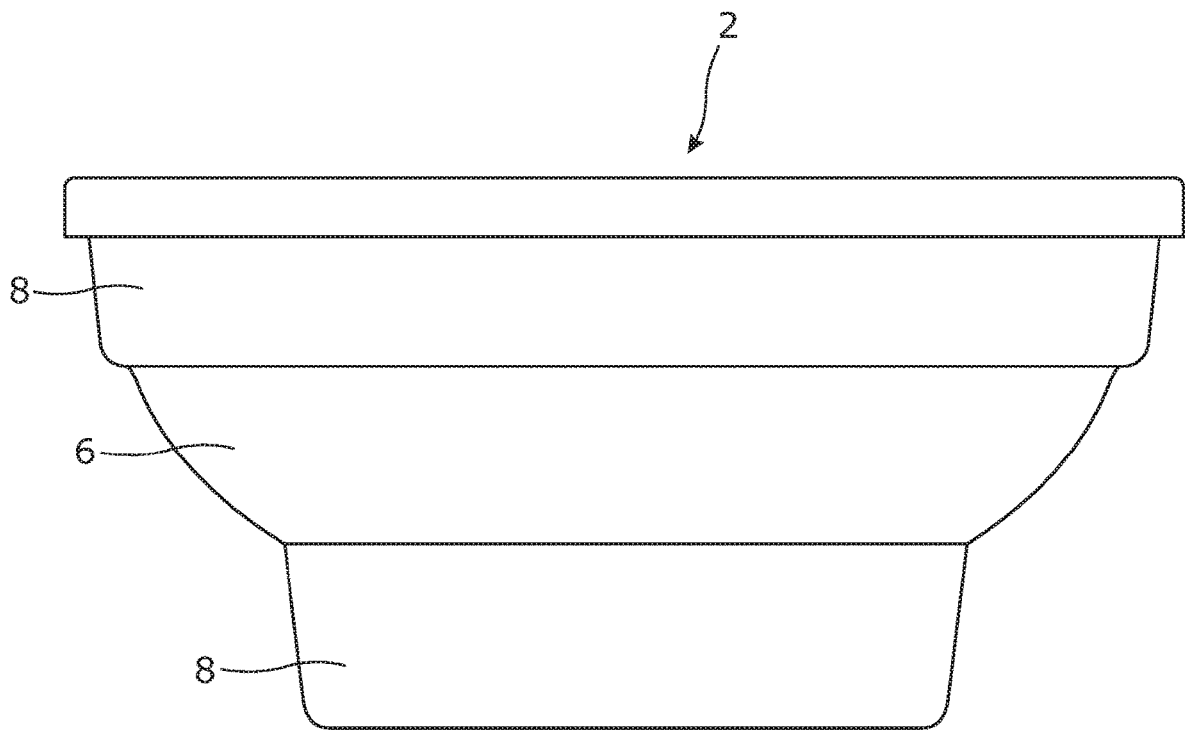
FIGS. 4a and 4b shows one embodiment of the present invention in its extended state.
Figure 4B:
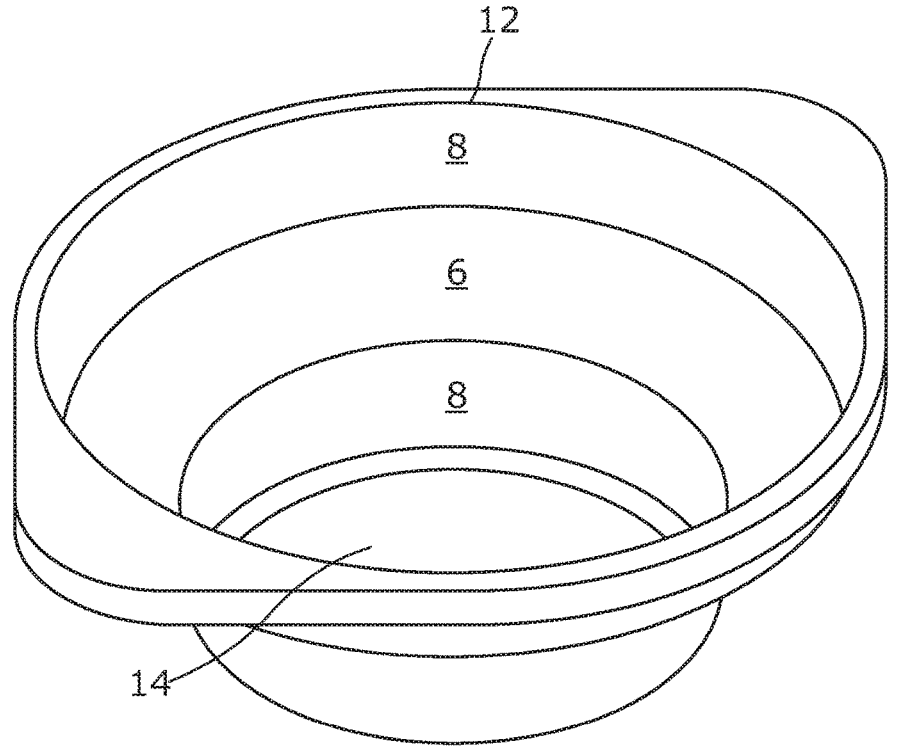
Figure 5A:
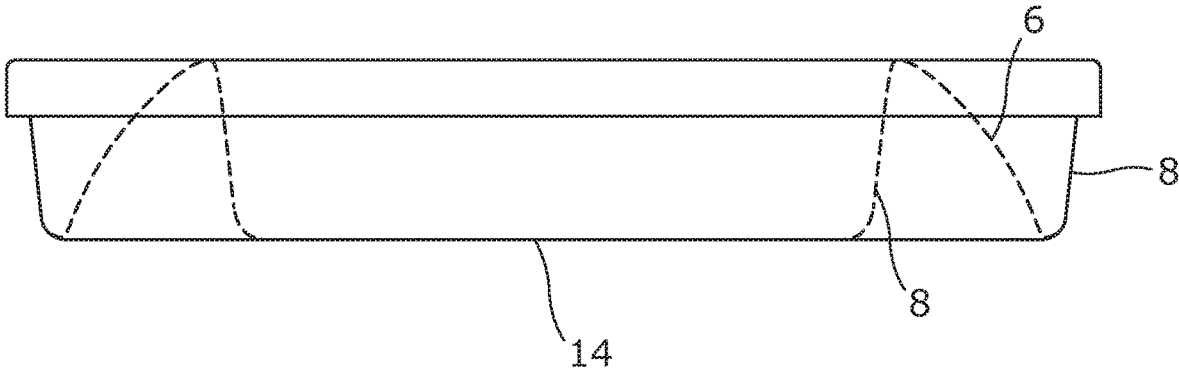
FIGS. 5a and 5b show one embodiment of the present invention in its collapsed state.
Figure 5B:
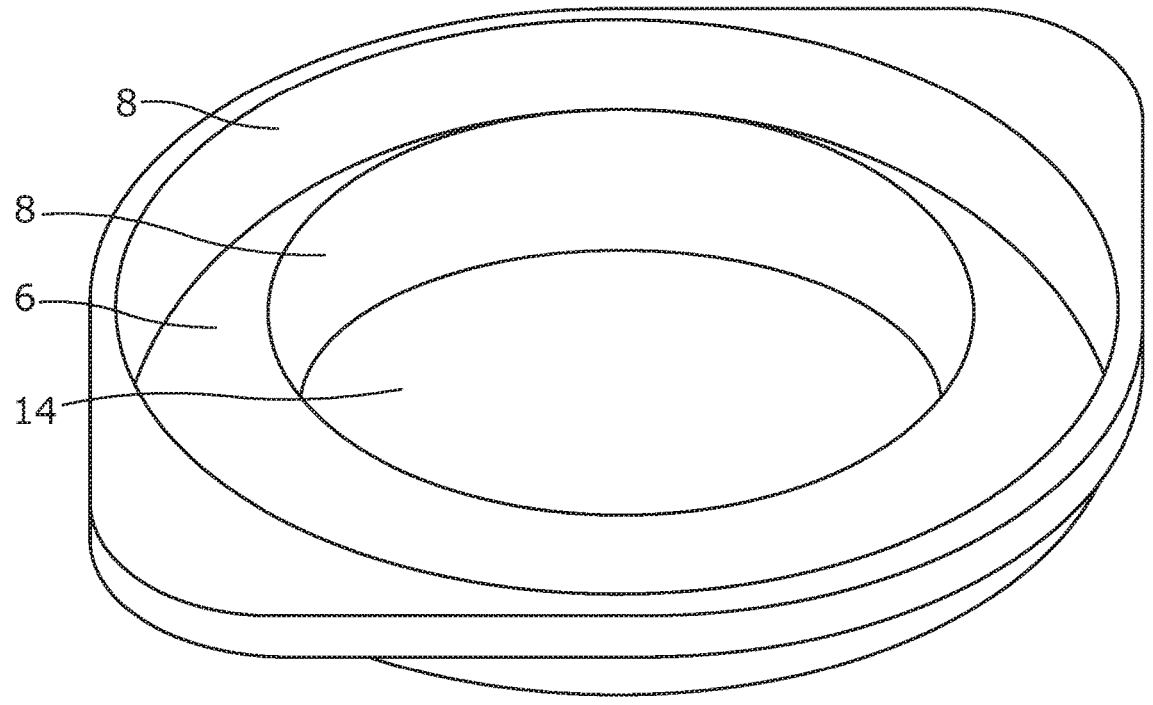
Figure 6A:
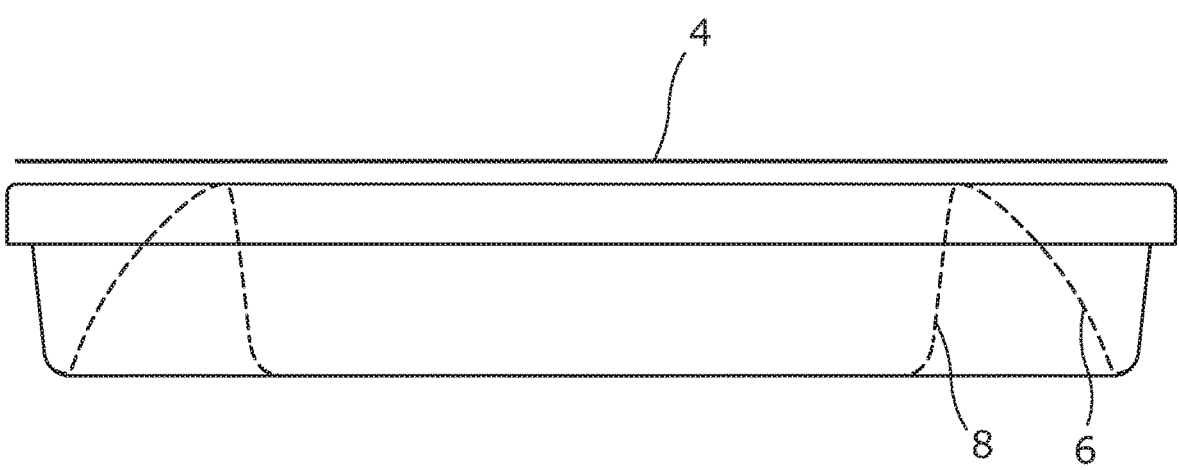
FIGS. 6a and 6b shows the present invention in its collapsed state with lid attached.
Figure 6B:
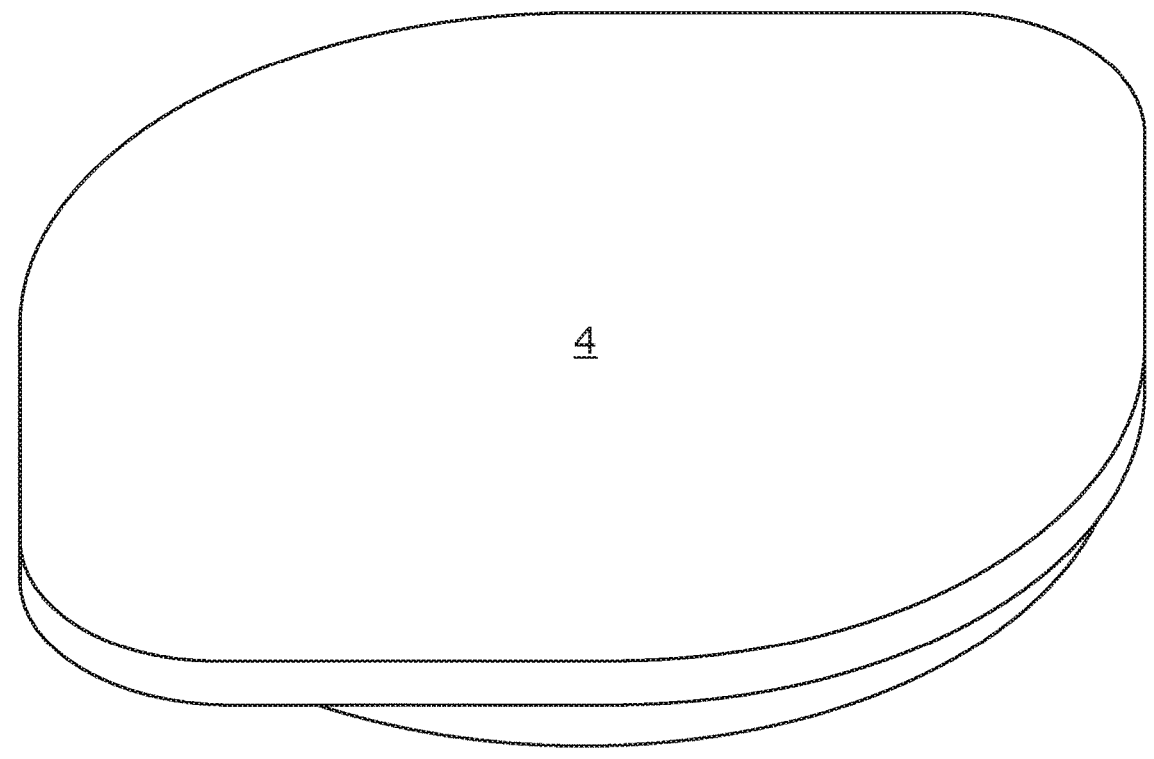

Turning to FIGS. 4a and 4b which show the present invention in its extended state forming a circular bowl with one area of flexion 6 and two rigid side walls 8. The bowl in this example includes a circular base 14, which is also more rigid than the area of flexion 6. The bowl in its collapsed configuration is shown in FIGS. 5a and 5b, and the same embodiment including a lid 4 is shown in FIGS. 6a and 6b.

Figure 7A:
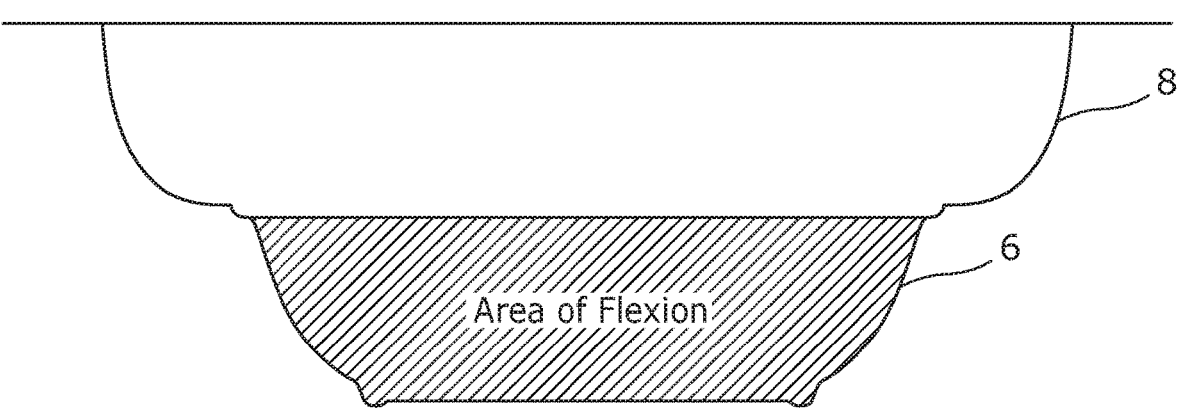
FIGS. 7a and 7b show one embodiment of the present invention with one area of flexion and one fixed/side wall.
Figure 7B:
Figures 8A, 8B:
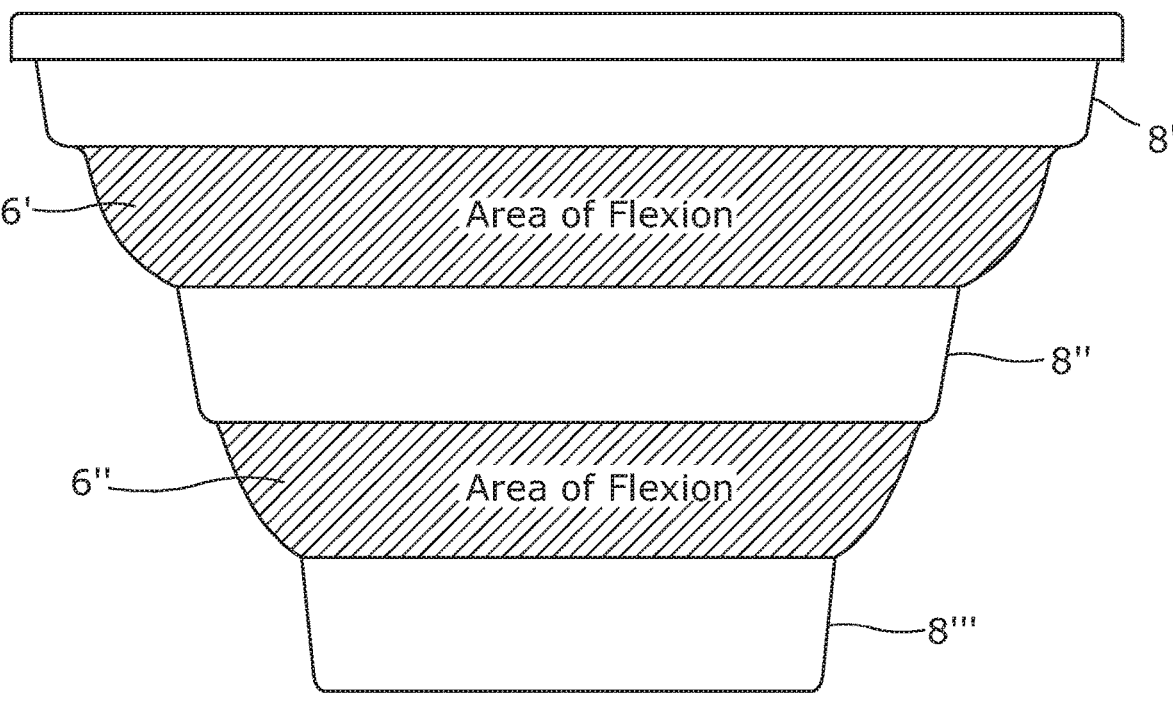
FIGS. 8a and 8b shows one embodiment of the present invention with two areas of flexion and three fixed walls.

FIGS. 7a and 7b show extended and collapsed configurations respectively of a container 2 which has a single thin wall or area of flexion 6 and a single fixed or side wall 8. FIGS. 8a and 8b also show extended and collapsed configurations with two areas of flexion 6', 6" between three fixed or side walls 8', 8", 8'".

Figure 9A:
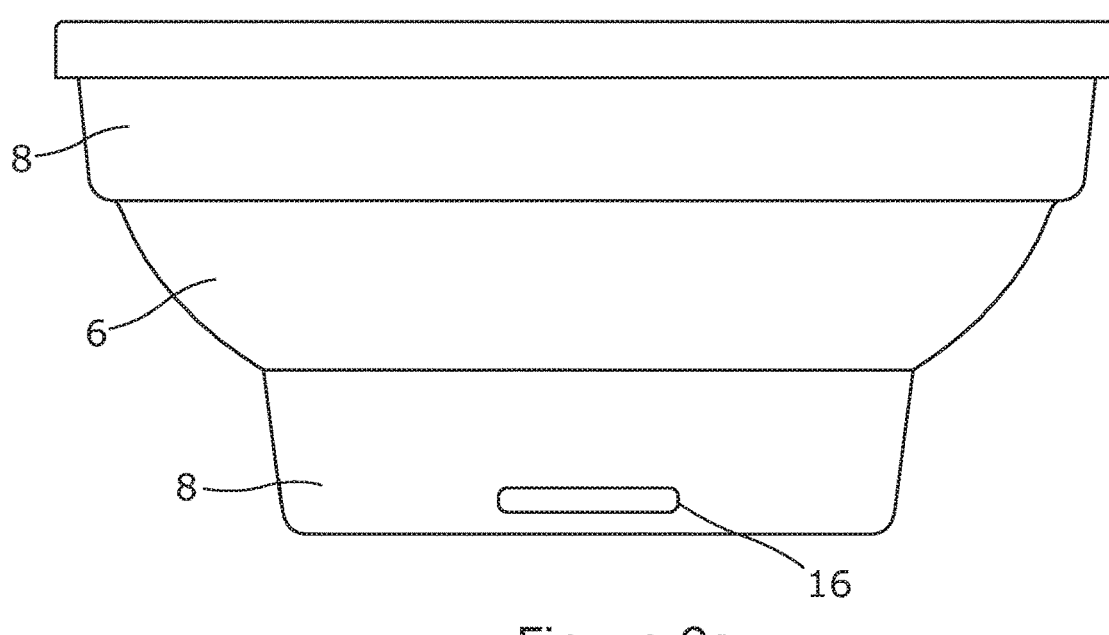
FIGS. 9a-10 show one embodiment of the present invention with the container formed to such a profile that an eating utensil can be attached to it.
Figure 9B:
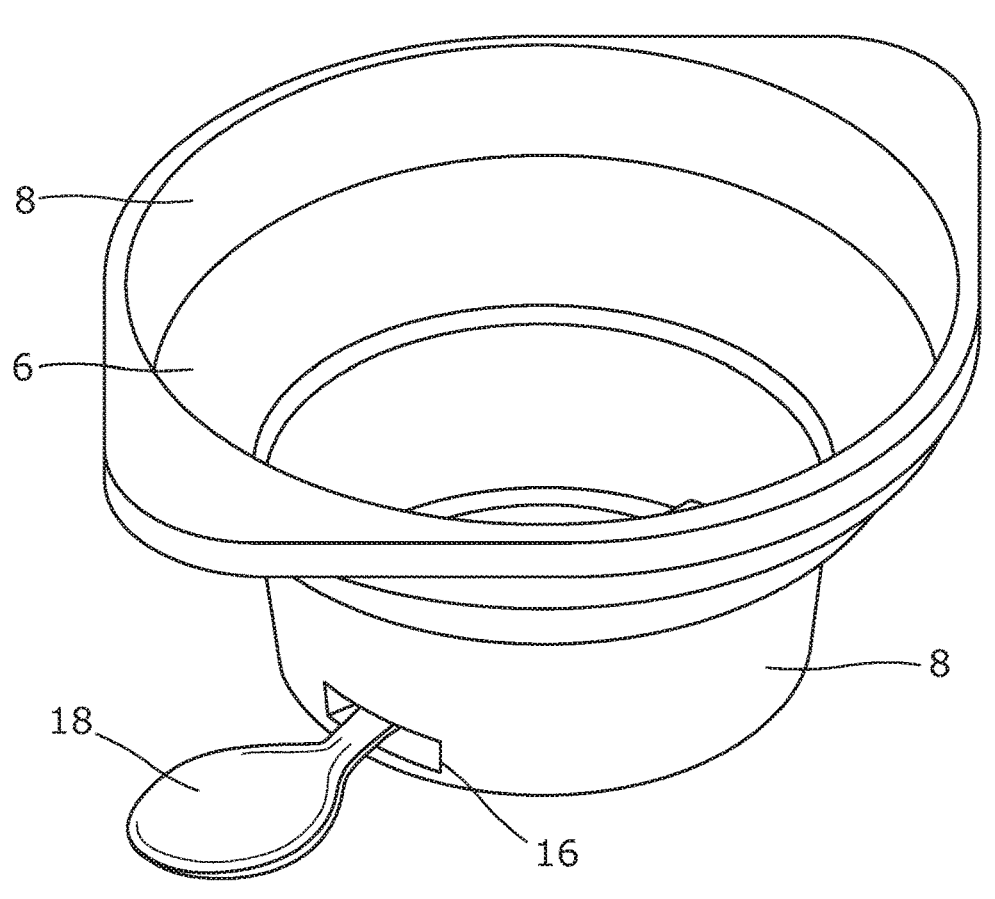
Figure 10:
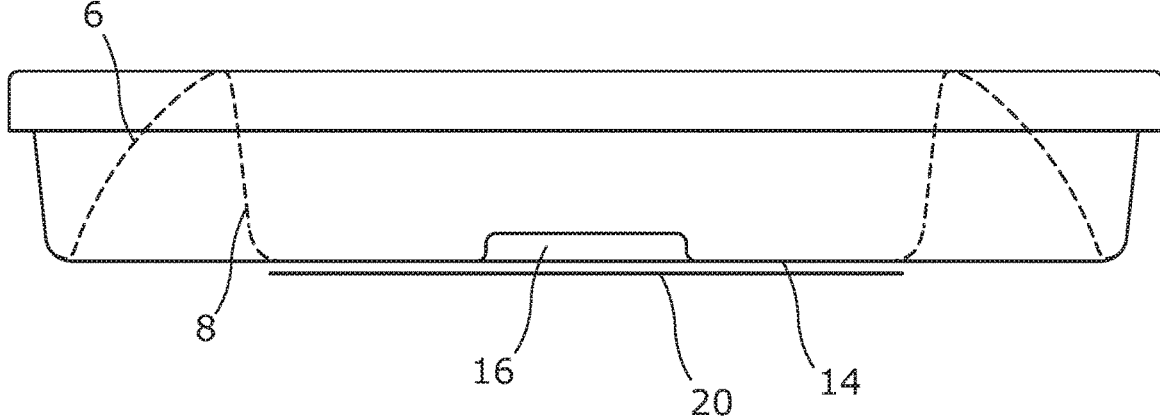

Turning to FIGS. 9a and 9b the base wall or side wall portion is configured with apertures or holes 16 formed therein such that a utensil 18, in this example a spoon can be located in and/or attached to the same. The apertures 16 are formed below the base of the container in this example. FIG. 10 shows an embodiment wherein the aperture 16 is in the form of a channel and the utensil (not shown) can be secured by a label 20 positioned over the aperture.

Figure 11A:
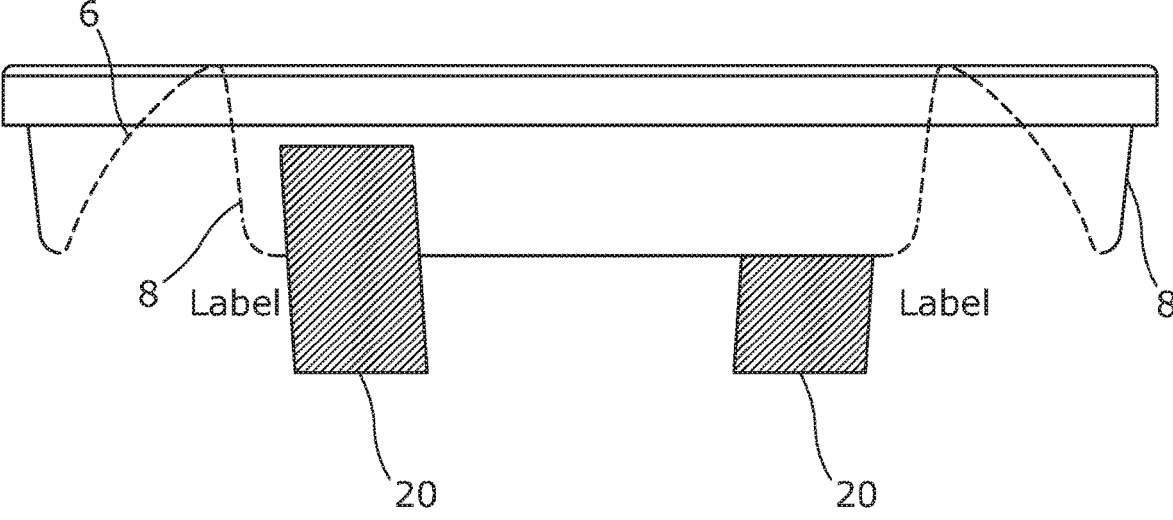
FIGS. 11a and 11b show one embodiment of the present invention with a label attached to the base of the container which can be used to pull the pot from its collapsed to its extended state.
Figure 11B:
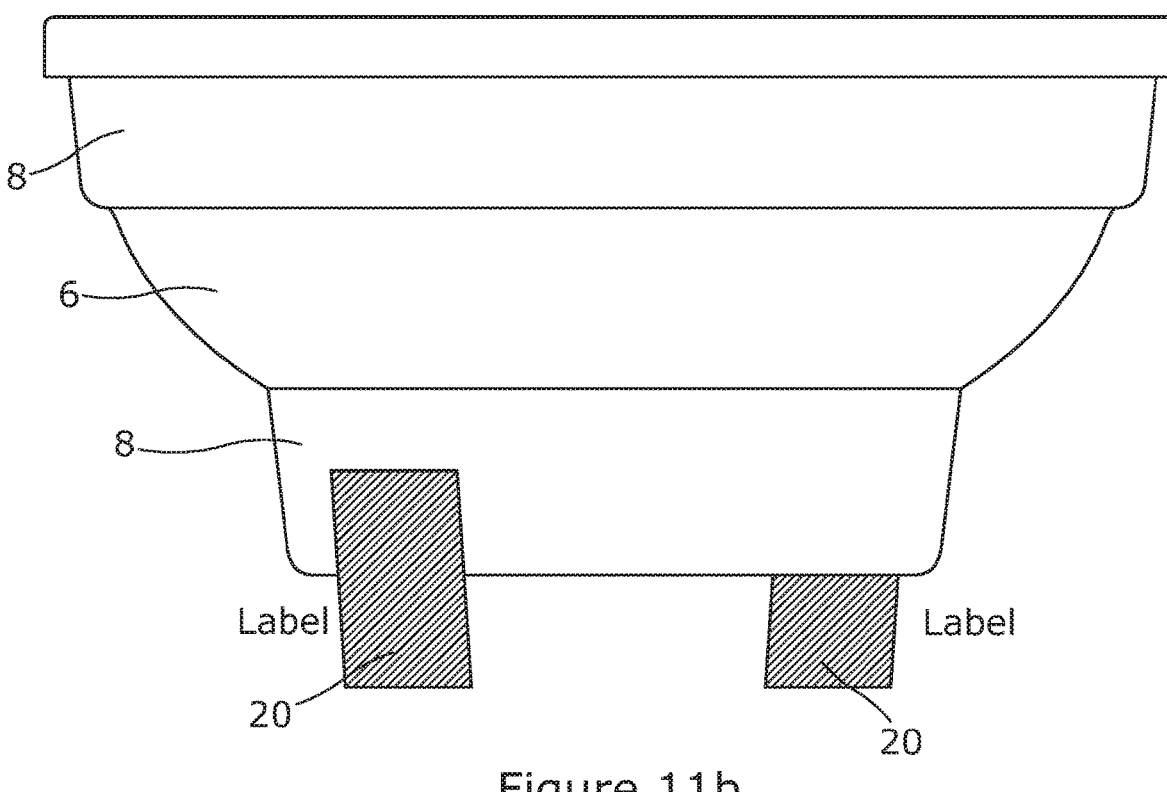

FIGS. 11a and 11b show how the label 20 can be used to move the container 2 from the collapsed to the expanded configuration, by acting as a tab which can be pulled by the user. The label could be perforated and/or include a frangible portion to allow the same to form two tabs.

Figure 12A:
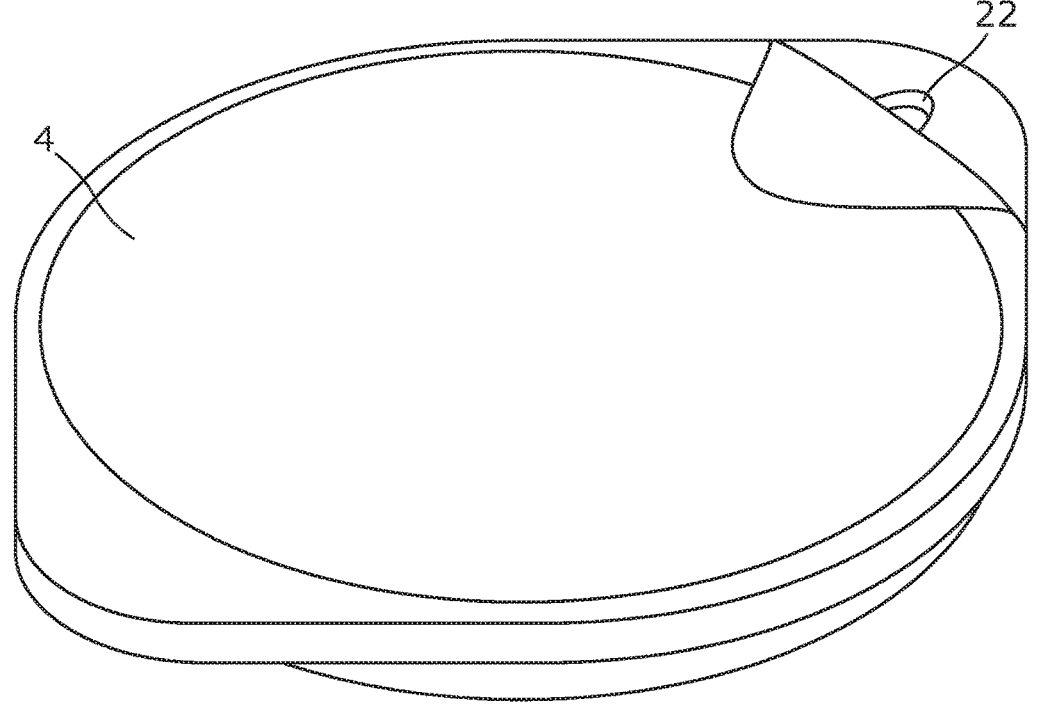
FIGS. 12a and 12b show one embodiment of the present invention with a breather hole molded into the container.
Figure 12B:
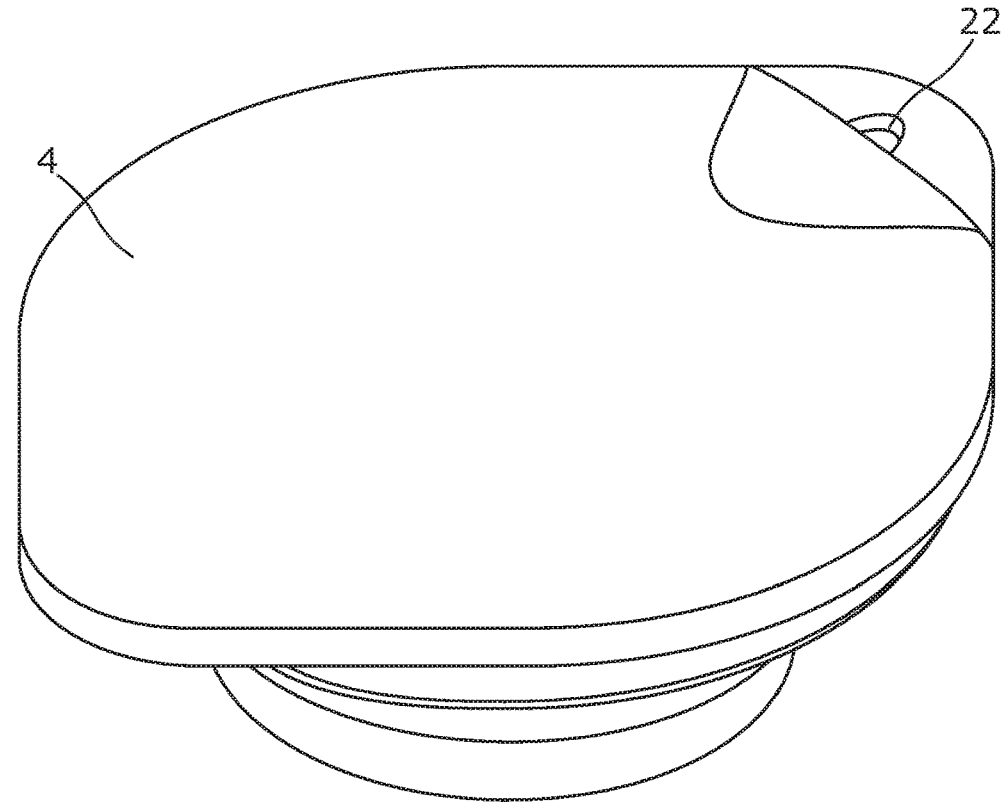
Figure 13A:
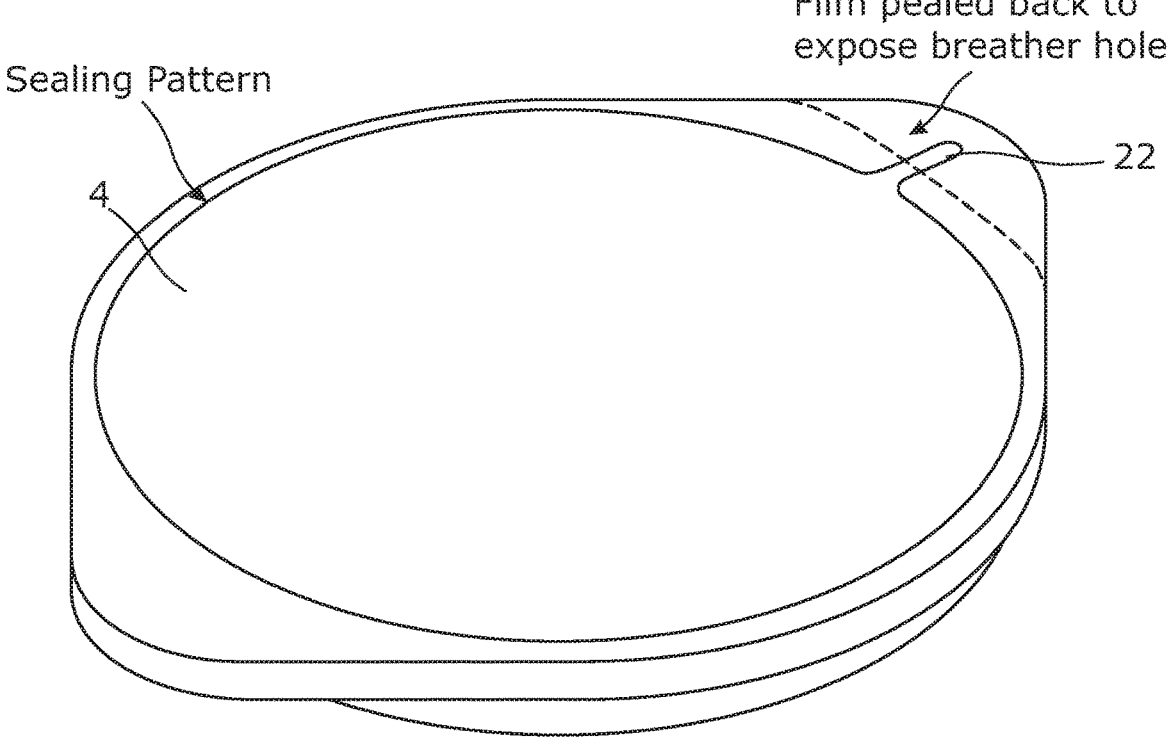
FIGS. 13a and 13b show one embodiment of the present invention with a breather hole incorporated into the film lid sealing pattern.
Figure 13B:
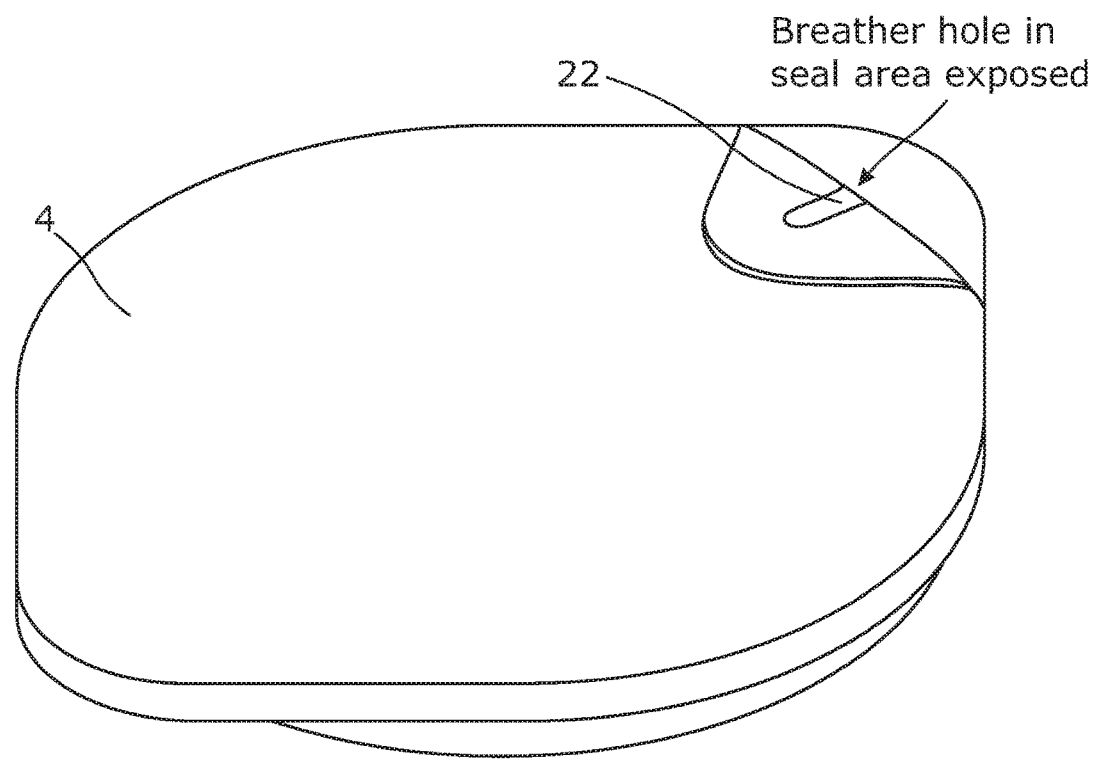

FIGS. 12 a and 12b shows one embodiment of the present invention with a breather hole 22 molded into the container which, when the lid 4 is partially pealed back to expose, allows the vacuum inside the container to be released and container expanded into its extended state. FIGS. 13a and 13b show an embodiment of the present invention with a breather hole 22 incorporated into the film lid 4 sealing pattern. The lid 4 is partially pealed back to expose the breather hole allowing the vacuum inside the container to be released and container expanded into its extended state. It should be noted that by increasing or reducing the size of this hole the rate air is expelled and pressure created within the container, throughout the cooking process, can be controlled.

Figure 14:
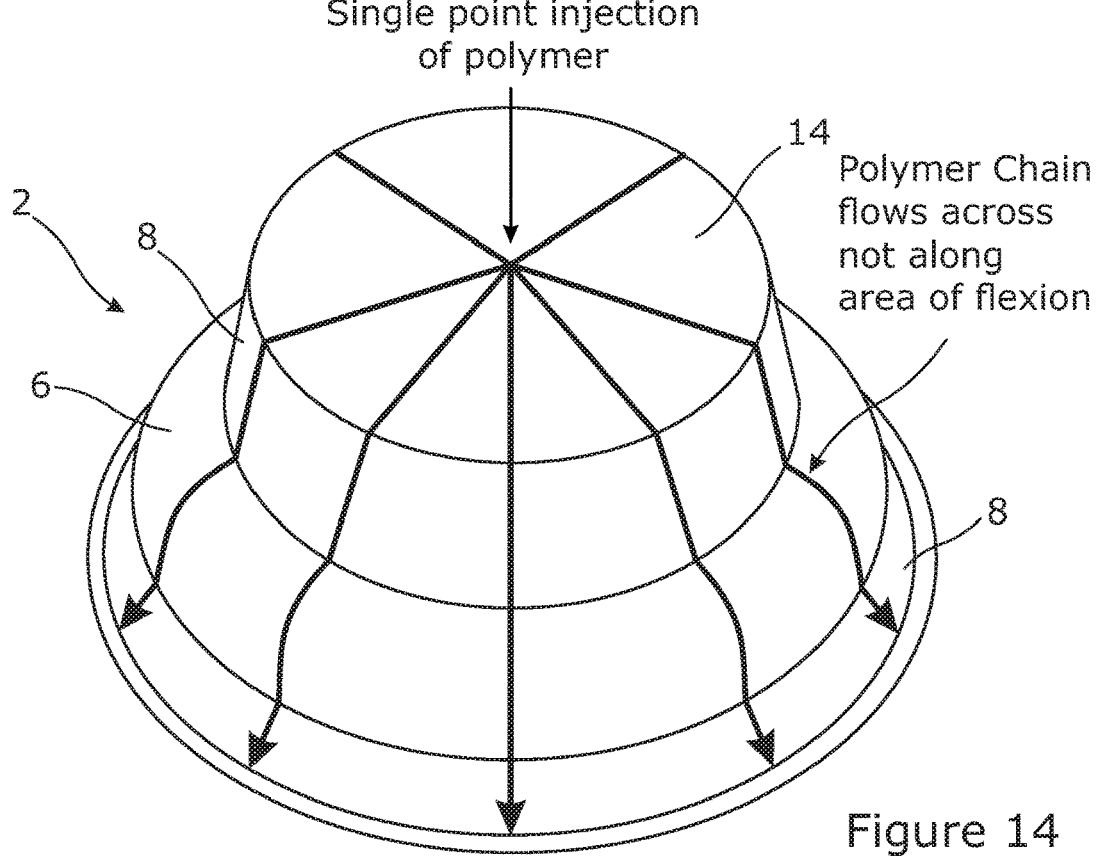
FIG. 14 shows how the polymer molecular chain flows across and not around the areas of flexion when the present invention is manufactured using the single point injection moulding process.
Figure 15:
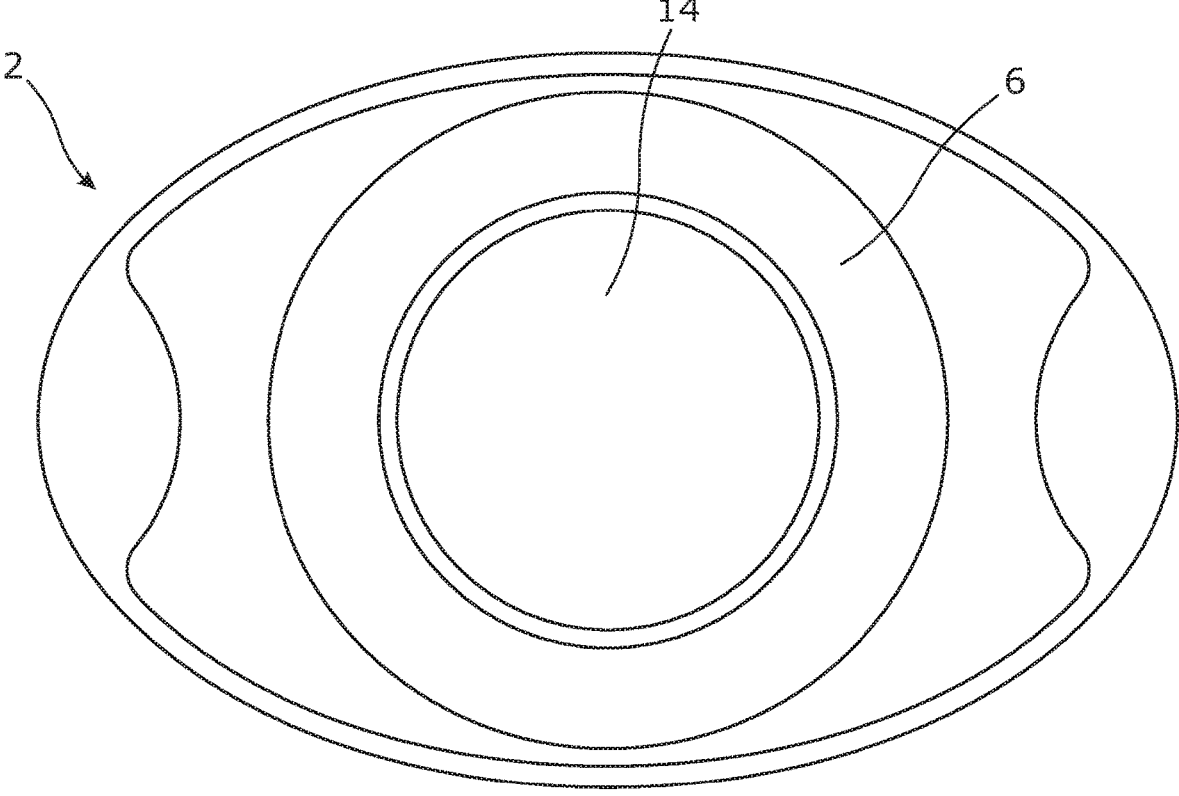
FIG. 15 shows one embodiment of the present invention in an oval shape.

Turning to FIG. 14 wherein it is shown how the polymer molecular chain flows across and not around the areas of flexion when the present invention is manufactured using the single point injection moulding process. Finally, FIG. 15 shows one embodiment of the present invention in an oval shape. Someone skilled in the art will recognise the container could be moulded into many shapes.

FIGS. 16a and 16b illustrate an embodiment wherein a portion 24 of the thin wall portion/area of flexion 6 extends into the thicker side wall 8. The area of flexion 6, effectively the thinner wall section, can be extended into thicker sections of adjacent walls creating areas within the thicker wall sections 8 that flex as the container is formed, reducing the total force required to erect to container. FIG. 6b shows that as force is applied the thinner section 24 in the side wall 8 collapses, reducing the internal dimension and the force required to form the bowl.

The invention claimed is:

1. A circular container for both storage and preparation of food or beverage items comprising:

two or more wall portions of polypropylene that include a first sidewall portion and at least one thin wall portion;

a base portion; and a lid, wherein the circular container is convertible between a first flattened storage or transport condition and a second in-use or expanded condition by manipulation of the two or more wall portions or said base portion, wherein the at least one thin wall portion is located between the first sidewall portion and the base portion, wherein the at least one thin wall portion is between 0.25 mm and 0.45 mm thick and the top to bottom length of the at least one thin wall portion is at least 25% greater or longer than the linear distance between the first sidewall portion and a second sidewall portion or the base portion, where the linear distance is the horizontal distance between the first sidewall portion and a second sidewall portion or the base portion when viewed in horizontal or plan cross section in said second or in-use or expanded condition such that the at least one thin wall portion forms a region of flexion that bends at one or more points on the area of the thin wall portion so the at least one thin wall portion rolls when moving the circular container between the first flattened storage or transport condition and the second in-use or expanded condition, and wherein the region of flexion non-linear along its length when viewed in vertical cross section in at least the first flattened storage or transport condition and the second in-use or expanded condition, and wherein the first sidewall portion and the at least one thin wall portion partition the inside of the circular container into two or more separate compartments for location or separation of food or beverage items when in the first flattened storage or transport condition, said two or more separate compartments concentric with the first sidewall portion, and wherein the container is formed by single point injection moulding which ensures the correct molecular alignment of the polymer by flowing the polymer across and not around the at least one thin or foldable wall portion; and wherein the region of the flexion acts as a spring that biases the circular container into the first flattened storage or transport condition or the second in-use or expanded condition.

2. The circular container according to claim 1 wherein the at least one thin wall portion of polypropylene thickness is 0.31 mm.

3. The circular container according to claim 1 wherein the circular container is manufactured from polypropylene base material plus plasticiser additives for hot fill, microwave and other food applications.

4. The circular container according to claim 1 wherein the circular container includes the first sidewall portion and the second side wall portion wherein the at least one thin wall portion is disposed or located between the first sidewall portion and the second side wall portion.

5. The circular container according to claim 4 wherein the second sidewall portion is attached to or depends from the base portion.

6. The circular container according to claim 1 wherein as force is applied, the at least one thin wall portion extends into the first sidewall portion and bends, thereby reducing the internal dimension and the force required to form the circular container to the second in-use or expanded condition.

7. The circular container according to claim 1 wherein said lid is removable to access the items contained therein in use.

8. The circular container according to claim 1 wherein the two or more wall portions are linear, straight or non-curved when viewed in vertical cross-section.

9. The circular container according to claim 8 wherein the at least one thin wall portion is more flexible or less rigid than the first sidewall portion.

\* \* \* \* \*